(12) United States Patent
Kim et al.

(10) Patent No.: US 8,539,541 B2
(45) Date of Patent: *Sep. 17, 2013

(54) REMOTE CONTROL DEVICE AND REMOTE CONTROL METHOD USING THE SAME

(75) Inventors: Jongcheol Kim, Seoul (KR); Jongsoon Park, Seoul (KR); Jinyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 536 days.

This patent is subject to a terminal disclaimer.

(21) Appl. No.: 12/856,436

(22) Filed: Aug. 13, 2010

(65) Prior Publication Data

US 2011/0037851 A1 Feb. 17, 2011

Related U.S. Application Data

(60) Provisional application No. 61/233,834, filed on Aug. 14, 2009.

(30) Foreign Application Priority Data

| Sep. 7, 2009 | (KR) | 10-2009-0084215 |
| Sep. 11, 2009 | (KR) | 10-2009-0086157 |
| Sep. 23, 2009 | (KR) | 10-2009-0090025 |

(51) Int. Cl.
*H04N 7/16* (2011.01)

(52) U.S. Cl.
USPC ............... 725/133; 725/141; 725/153

(58) Field of Classification Search
USPC ............ 348/734; 725/133, 141, 153
See application file for complete search history.

(56) References Cited

U.S. PATENT DOCUMENTS

| 5,883,621 | A | * | 3/1999 | Iwamura | 725/37 |
| 7,043,691 | B1 | * | 5/2006 | Kwon et al. | 715/705 |
| 7,542,099 | B2 | * | 6/2009 | Ellgen et al. | 348/706 |
| 7,554,614 | B2 | * | 6/2009 | Satou | 348/734 |
| 2005/0110909 | A1 | | 5/2005 | Staunton et al. | |
| 2006/0248462 | A1 | | 11/2006 | Ofek et al. | |

FOREIGN PATENT DOCUMENTS

| KR | 10-2004-0098046 A | 11/2004 |
| KR | 10-2005-0087487 A | 8/2005 |
| KR | 10-2005-0119453 A | 12/2005 |

* cited by examiner

*Primary Examiner* — Hunter B Lonsberry
(74) *Attorney, Agent, or Firm* — Birch, Stewart, Kolasch & Birch, LLP

(57) ABSTRACT

A remote control device and method is provided. The remote control device and method provide a more intuitive and convenient user interface to a user. The remote control device and method allow a user to browse a plurality of contents provided by a target device and execute desired contents in the target device more intuitively and conveniently. The remote control device and method also allow a user to select an external device connected to a target device and execute contents, provided by the external device, in the target device more intuitively and conveniently.

20 Claims, 21 Drawing Sheets

(a)

(b)

(a)

(b)

Fig. 12A
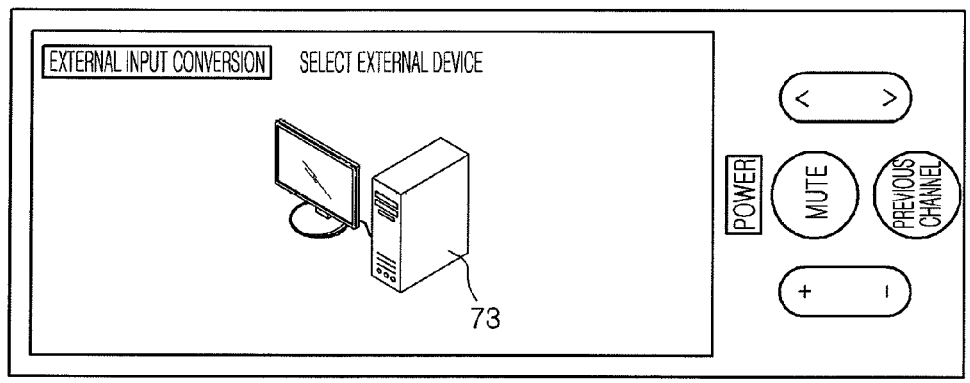
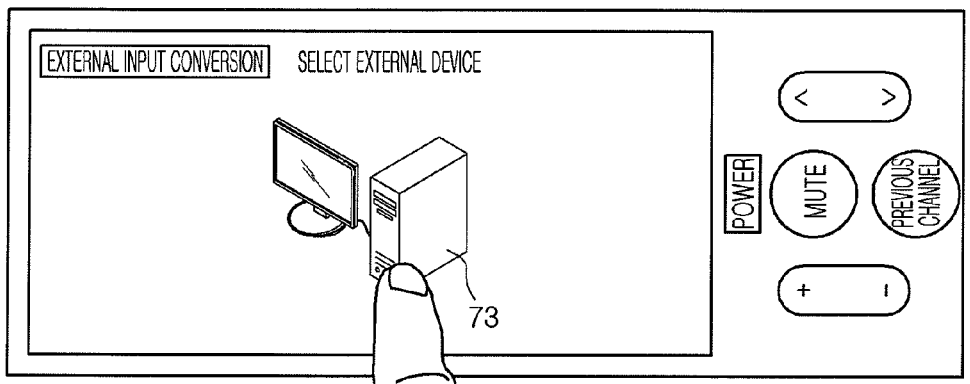
Fig. 12B

Fig. 16
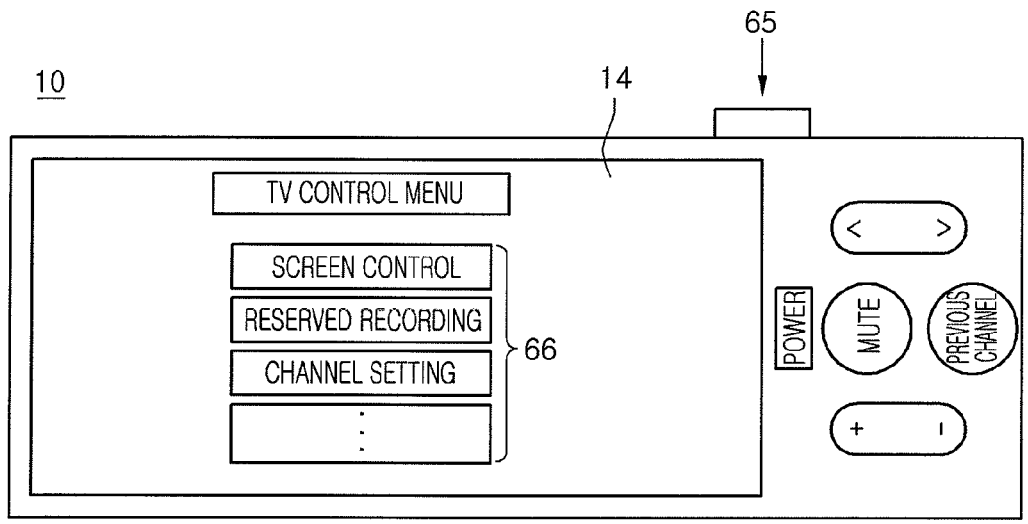
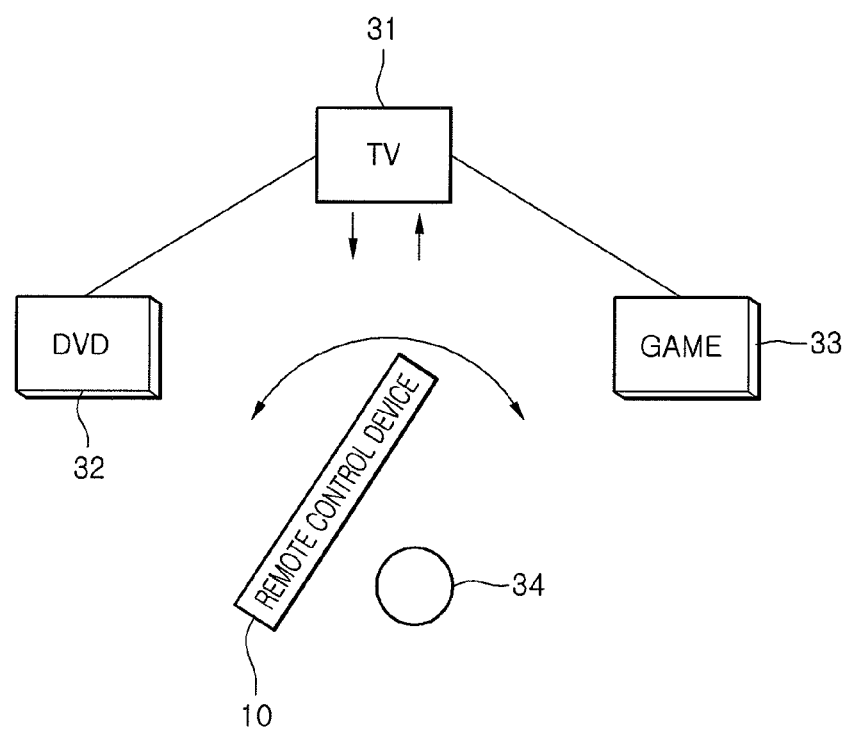
Fig. 17

REMOTE CONTROL DEVICE AND REMOTE CONTROL METHOD USING THE SAME

CROSS-REFERENCE TO RELATED APPLICATIONS

The present application claims the benefit of priority under 35 U.S.C. §119 to Korean Patent Application No. 10-2009-0090025 filed on Sep. 23, 2009, Korean Patent Application No. 10-2009-0086157 filed on Sep. 11, 2009, Korean Patent Application No. 10-2009-0084215 filed on Sep. 7, 2009, and Provisional Application No. 61/233,834 filed on Aug. 14, 2009, which are hereby incorporated by reference in their entirety.

BACKGROUND OF THE INVENTION

1. Field of the Invention

The present invention relates to a remote control device and method, and more particularly, to a remote control device and method for synthesizing/displaying a captured actual image of a target device and a virtual image of contents provided by the target device.

2. Discussion of the Background Art

There are remote controllers that control electronic devices such as televisions (TVs), DVD players, games and audios. Such remote controllers use infrared rays to transmit binary codes to electronic devices, thereby controlling the volume, channel and operation mode of the electronic devices.

Recently, an integrated remote controller capable of controlling a plurality of electronic devices solely by one remote controller has been launched according to an increase in the type and number of electronic devices provided in a home.

However, such an integrated remote controller has failed to provide other additional conveniences than the convenience of integrating remote controllers of electronic devices.

What is therefore required is a new remote control device that can control electronic devices more conveniently and intuitively.

SUMMARY OF THE INVENTION

The present invention provides a remote control device and method for providing a more intuitive and convenient user interface to a user.

The present invention also provide a remote control device and method for browsing a plurality of contents provided by a target device and executing desired contents in the target device more intuitively and conveniently.

The present invention also provide a remote control device and method for selecting an external device connected to a target device and executing contents, provided by the external device, in the target device more intuitively and conveniently.

In an embodiment, there is an automatic control device that includes: a camera unit capturing an image of a target device; a communication unit receiving information of contents provided by the target device and transmitting a control signal to the target device; a display unit displaying a synthesized image of a captured actual image of the target device and a virtual image of the contents; a user input unit receiving a user input to control the virtual image; and a control unit controlling/displaying the virtual image according to the received user input.

In another embodiment, there is an automatic control method that includes: capturing an image of a target device; receiving information of contents provided by the target device; generating a virtual image of the contents on the basis of the received contents information; and displaying a synthesized image of the captured actual image of the target device and the virtual image of the contents.

The present invention provides a more intuitive and convenient user interface to a user.

The present invention also makes it possible to browse a plurality of contents provided by a target device and execute desired contents in the target device more intuitively and conveniently.

The present invention also makes it possible to select an external device connected to a target device and execute contents, provided by the external device, in the target device more intuitively and conveniently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram illustrating a target device control method in accordance with an embodiment of the preset invention;

FIG. 17 is a diagram illustrating a method for controlling a target device without orienting a remote control device toward the target device, in accordance with an embodiment of the preset invention.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to the accompanying drawings.

Figure 1:
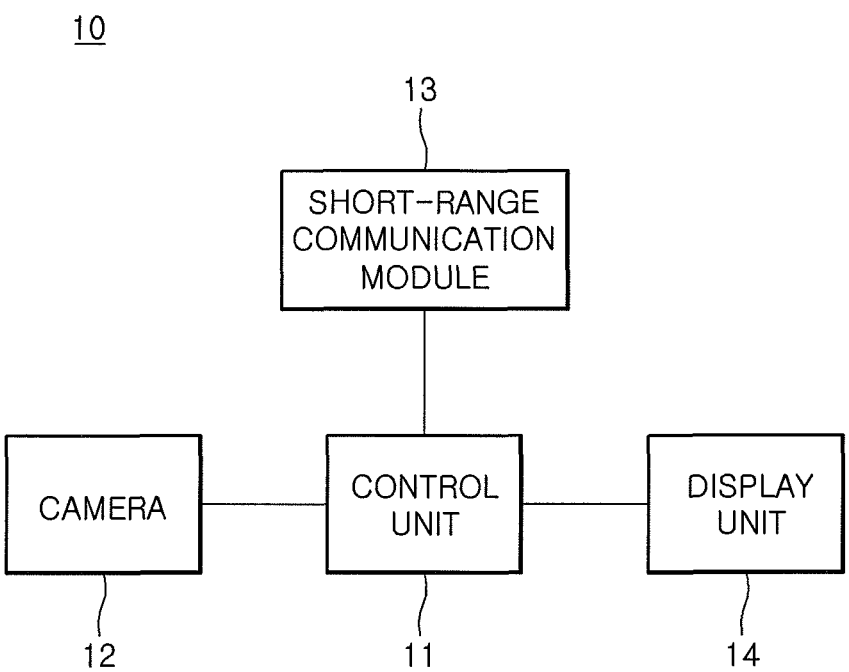
FIG. 1 is a block diagram of a remote control device in accordance with an embodiment of the preset invention.

FIG. 1 is a block diagram of a remote control device in accordance with an embodiment of the preset invention.

Referring to FIG. 1, a remote control device 10 in accordance with an embodiment of the preset invention may include: a camera 12 capturing an image of a target device; a short-range communication module 13 transmitting a control command to the target device and communicating with the target device; a display unit 14 displaying the captured actual image of the target device or a virtual image related to the target device; and a control unit 11 generating a control signal for control of the target device, generating the virtual image related to the target device, and controlling the actual image and the virtual image to be displayed in a synthesized manner.

The target device may be an electronic device controlled by the remote control device 10. For example, the target device may be a broadcast receiving device (e.g., TV) or an image display device equipped with a display unit. In embodiments, the target device may be one of various external devices (e.g., DVD players, Blu-ray players, VCRs, PCs, MP3 players, audios, DVix players, and games) that are connected to the broadcast receiving device or the image display device. However, the target devices are not limited to the above described entertainment devices. The target devices may also be home appliances such as washers, dryers, air conditioners, refrigerators and other kitchen appliances. The target device may also be a computer or other personal information processing device such as an electronic tablet or the like. The target device may also be a vending machine. The target device may be an automobile.

The camera 12 captures an image of the target device and transfers the captured image to the control unit 11. The camera 12 may be a camera module installed in a mobile terminal such as a mobile phone.

The short-range communication module 13 communicates with the target device, transfers a command of the remote control device 10, and receives data from the target device. The short-range communication module 13 may include one of various communication modules (e.g., Bluetooth modules, infrared communication modules, ZigBee modules, Near Field Communication (NFC) modules, and RF communication modules) or a combination thereof.

The display unit 14 displays an image captured by the camera 12. In an embodiment, the display unit 14 displays a synthesized image of the virtual image generated by the control unit 11 and the actual image of the target device captured by the camera 12 under the control of the control unit 11. In using Bluetooth or infrared or another mechanism, it is possible for the short-range communication module 13 to communicate with a target device that is in a cabinet or in another room. In that case, the display unit 14 again displays a synthesized image of the virtual image generated by the control unit 11 and the actual image of the cabinet or wall captured by the camera 12.

The display unit 14 may include at least one of various information display devices such as LCDs, OLEDs, VFDs and electrophoresis devices.

Also, the display unit 14 may be a touchscreen having a touch panel at a front side thereof. The touch panel may be one of various touch panels such as resistive touch panels and capacitive touch panels.

The control unit 11 controls the above-described units to generate a synthesized image of an actual image captured by the camera 12 and a virtual image related to it. As will be described below, the virtual image may be an image related to a target device photographed. If the target device is a TV, the virtual image may be a channel browsing image for a plurality of channels, or an image including information about external devices connected to the TV. If the target device is one of external devices such as DVD players, Blu-ray players, VCRs, PCs, MP3 players, audios, DVix players and games, the virtual image may be an image including information about contents providable by the external devices.

In an embodiment, a motion sensor may be installed in the remote control device 10 to detect the gesture of a user applied to the remote control device 10. The motion sensor may include at least one of various sensors (e.g., acceleration sensors, gyro sensors, and geomagnetic sensors) that can detect a motion of the remote control device 10.

As will be described below, gestures applied to the remote control device 10 may be detected and various commands may be mapped to the detected gestures. A more intuitive and convenient user interface may be provided to a user by inputting commands by gestures.

Figure 2A:
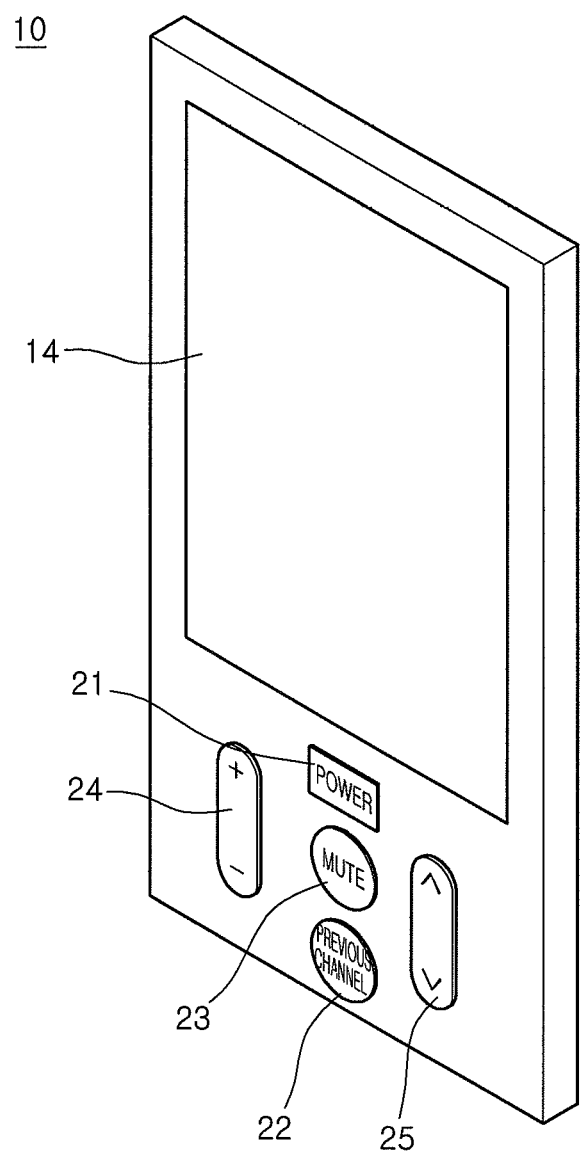
FIGS. 2A and 2B are perspective views of a remote control device 10 in accordance with an embodiment of the preset invention.
Figure 2B:
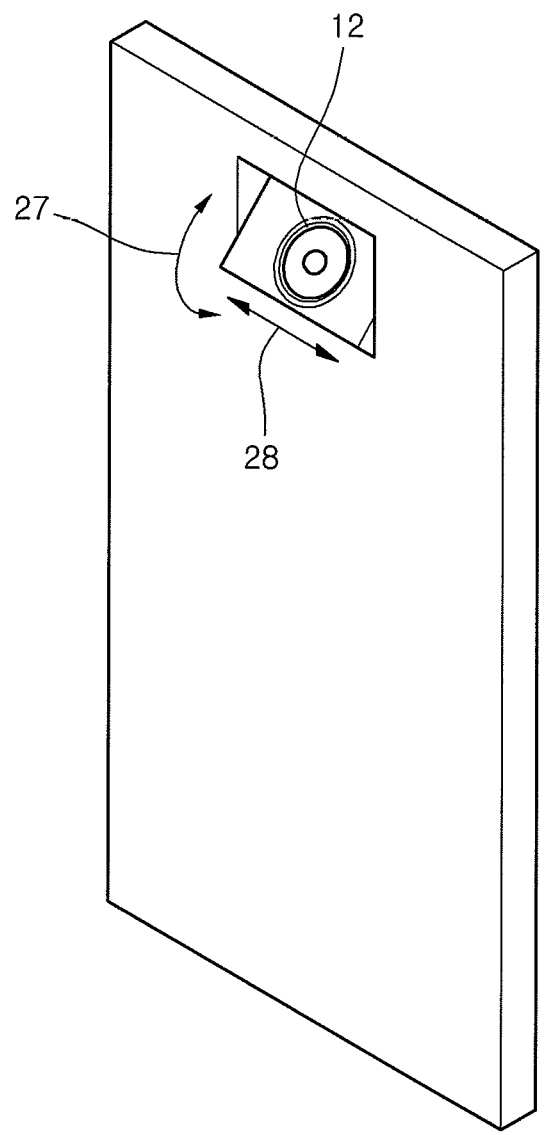

FIGS. 2A and 2B are perspective views of a remote control device 10 in accordance with an embodiment of the preset invention. FIG. 2A is a perspective view of a front side of the remote control device 10, and FIG. 2B is a perspective view of a rear side of the remote control device 10. In an embodiment, the front side of the remote control device 10 may be oriented toward a user and the read side of the remote control device 10 may be oriented toward a target device to be controlled.

As illustrated in FIG. 2A, a display unit 14 is disposed at the front side of the remote control device 10. The display unit 14 may be a touchscreen.

Other control buttons may be disposed at the units other than the display unit 14. The control buttons may include a power button 21, a channel control button 24, a volume control button 25, a mute button 23, and a previous channel button 22. In embodiments, the control buttons may further include various buttons according to the types of target devices. In an embodiment, a touchscreen may be used as the display unit 14 and the control buttons except one or two of the control buttons may be displayed on the touch screen.

Referring to FIG. 2B, a camera 12 is disposed at the rear side of the remote control device 10. The camera 12 may be oriented toward a target device in a capture operation mode. The camera 12 and the display unit 14 may be oriented in the opposite directions. For example, the camera 12 may be oriented toward a target device and the display unit 14 may be oriented toward a user.

In an embodiment, an actuator may be connected with the camera 12 to convert the orientation direction of the camera 12 in a vertical direction 27 or in a horizontal direction 28.

Figure 3:
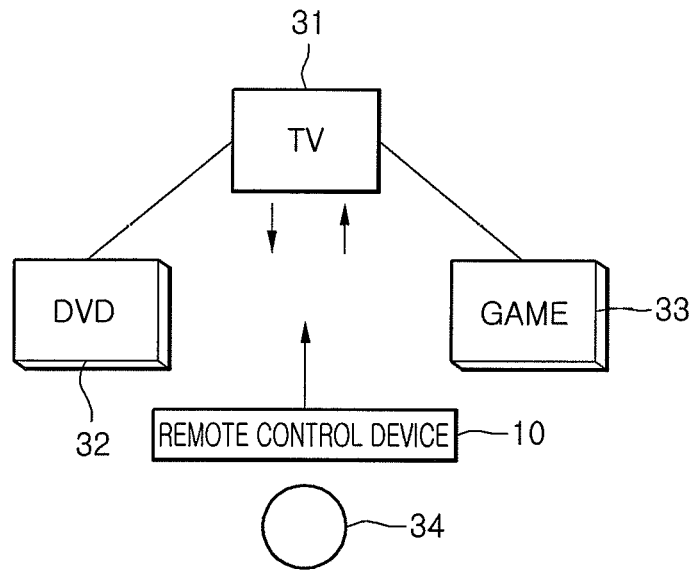
FIGS. 3 and 4 are diagrams illustrating a network configuration between an external device and a remote control device 10 in accordance with an embodiment of the preset invention.
Figure 4:
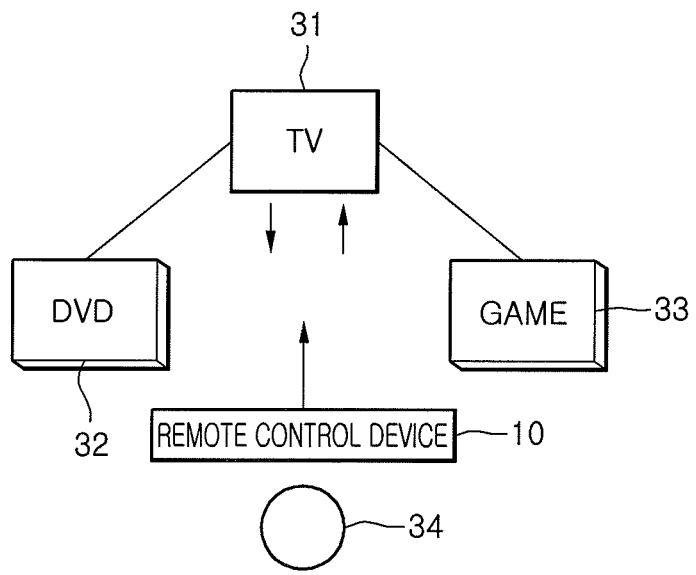

FIGS. 3 and 4 are diagrams illustrating a network configuration between an external device and a remote control device 10 in accordance with an embodiment of the preset invention.

As illustrated in FIG. 3, the remote control device 10 may communicate directly with a TV 31 (one of the target devices) and the TV 31 may communicate with other external devices 32 and in a wired or wireless manner. An image display device without a tuner may be used instead of the TV 31.

In this embodiment, the remote control device 10 communicates with the TV 31. According to a command received from the remote control device 10, the TV 31 transmits a command to the external device 32 and 33 or receives data from the external devices 32 and 33 and transmits the received data to the remote control device 10. To this end, the TV 31 is equipped with a short-range wireless communication module for communication with the remote control device 10, and the external devices 32 and 33 are equipped with a wired or wireless communication module for communication with the TV 31.

The TV 31 or the image display device may display contents received from the external devices 32 and 33. For example, when the DVD player 32 plays and transmits a DVD title to the TV 31, and the TV 31 displays contents included in the DVD title. Also, when a game title is played by the game 33, a game screen is displayed on the TV 31. If the external device is an MP3 player, only sounds may be outputted through the TV 31.

In an embodiment of the preset invention, as illustrated in FIG. 4, the remote control device 10 may be configured to directly communicate with the external device 32 and 33 as well as with the TV 31. In this case, the external devices 32 and 33 are equipped with a short-range wireless communication module for communication with the remote control device 10, as well as with a wired or wireless communication module for communication with the TV 31.

The short-range wireless communication module installed at the remote control device 10, the TV 31 or the external devices 32 and 33 may be one of various short-range wireless communication modules such as Bluetooth modules, infrared communication modules, ZigBee modules, Near Field Communication (NFC) modules and RF communication modules.

As illustrated in FIGS. 3 and 4, a user 34 may orient the remote control device 10 toward a desired target device to control the target device in various ways.

In various embodiments described below, the user may control the remote control device 10 to change an operation mode thereof. The various embodiments may be implemented when the remote control device 10 is in specific operation modes. The specific operation modes may include a control mode, a menu control mode, and a screen synchronization mode.

In an embodiment of the present invention, contents displayed by the target device, to which the remote control device 10 is oriented, may be displayed on the display unit 14 of the remote control device 10. This operation may be performed when the remote control device 10 is in a screen synchronization mode.

Referring to FIG. 3 or 4, the remote control device 10 is oriented toward the TV 31 in a turned-on state, contents displayed currently on the screen of the TV 31 (i.e., a TV broadcast program or a video image played by the DVD player) may be displayed on the screen of the remote control device 10 without any change.

If the tuner or the TV is an IPTV or a broadband TV, the TV 31 may display a broadcast program received through an Internet cable and may display contents received from the external devices 32 and 33.

Figure 5:
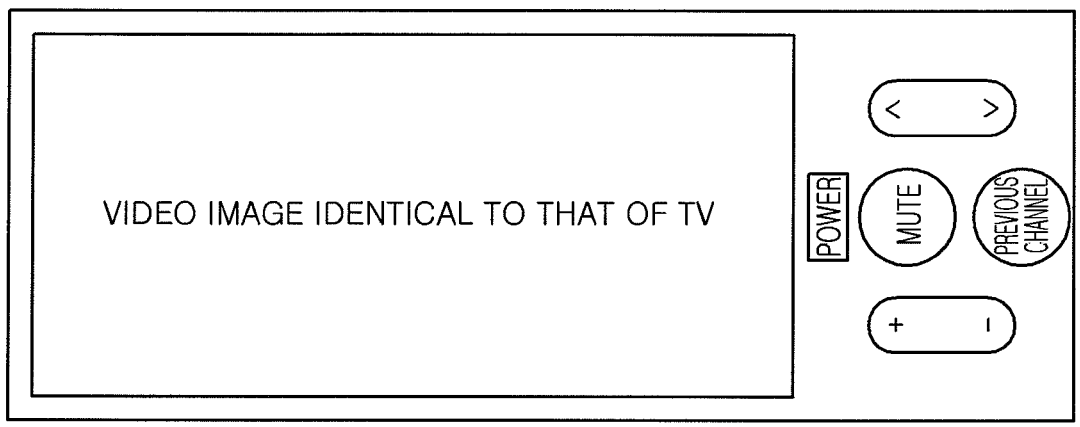
FIGS. 5 to 12 are diagrams illustrating an operation of a remote control device in accordance with an embodiment of the preset invention.

When the remote control device 10 is oriented toward the TV 31, the control unit 11 of the remote control device 10 determines through the camera 12 that the remote control device 10 is currently oriented toward the TV 31, and may receive the currently-played contents from the TV 31 to display the received contents on the display unit 14, as illustrated in FIG. 5.

The TV 31 transmits displayed image data to the remote control device 10 through the short-range communication module, and the remote control device 10 displays the image data on the display unit 14.

Even if the remote control device 10 (or the camera 12) is oriented toward another place after starting an operation of displaying under-play contents, remote control device 10 may continue to receive/display contents from the TV 31 until receiving another input from the user.

A remote control device 10 in accordance with an embodiment of the present invention may include: a camera 12 capturing an image of a target device; a communication unit 13 receiving information about contents provided by the target device and transmitting control signals to the target device; a display unit 14 displaying a synthesized image of a captured actual image of the target device and a virtual image related to the contents; a user input unit receiving a user input for control of the virtual image; and a control unit 11 controlling the virtual image to be controlled and displayed according to the received user input.

FIGS. 6 to 12 are diagrams illustrating an operation of a remote control device 10 in accordance with an embodiment of the preset invention.

Figure 6A:
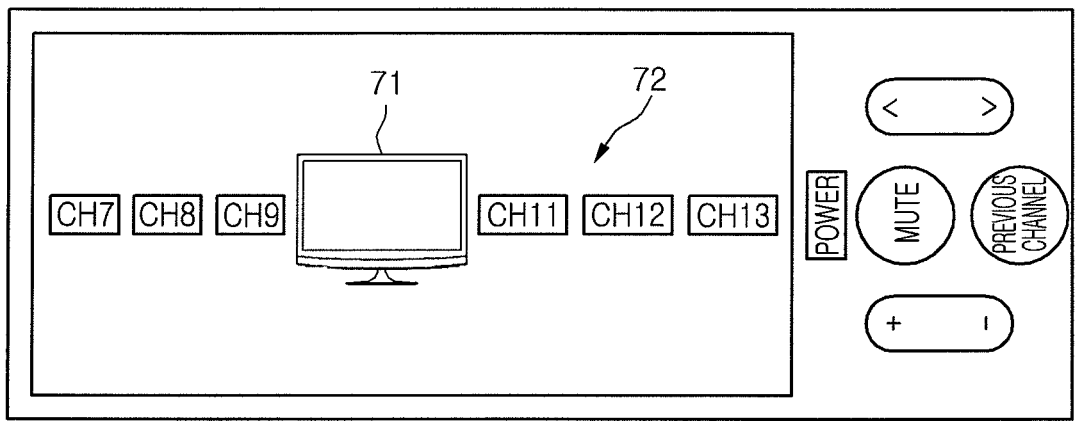

FIG. 6A illustrates a remote control device 10 displaying a synthesized image of an actual image 71 of a target device and a virtual image 72 provided by the target device, in accordance with an embodiment of the preset invention.

As illustrated in FIG. 6A, a camera unit 12 of the remote control device 10 photographs a target device and provides an actual image of the target device to a control unit 11.

As described above, the target device may be a broadcast receiving device such as a TV but is not limited thereto. For example, the target device may be one of various external devices such as display devices displaying images or pictures, audio devices outputting voices, DVD players connected in a wired or wireless manner to the broadcast receiving device to provide contents, Blu-ray players, games, mobile terminals, USB memories, VCRs, computers, and MP3 players.

The communication unit 13 receives information about contents provided by the target device. In an embodiment of the present invention, if the target device is a broadcast receiving device, the contents may be a broadcast channel provided by the broadcast receiving device and the contents information may be broadcast channel information. For example, the contents information may include a representative image, a broadcasting station name, and a channel number of the channel provided by the broadcast receiving device.

In an embodiment, if the target device is a DVD player, the contents may be a DVD title inserted into the DVD player and the contents information may include Title of the DVD title, Genre, Play Time, Rating Level, Representative Image, and Snapshot of Main Scene.

In an embodiment, if the target device is an audio player, the contents may be an audio disc into a corresponding reader or may be a stored audio file, and the contents information may include Title, Genre, Play Time, Rating Level, Representative Image, and Artist Information.

In an embodiment, if the target device is a computer, the contents may be pictures, voices, images and text data stored in the computer and the contents information may include Title of the contents and Representative Image.

The received contents information is provided to the control unit 11. The control unit 11 generates a virtual image of the contents on the basis of the contents information.

For example, on the basis of the contents information, the control unit 11 generates a virtual image of the contents provided by the target device.

The virtual image may be an image that represents a virtual object unlike an actual image captured by the camera unit 12. For example, the virtual image may be moving pictures, images or graphics generated by the control unit 11.

The control unit 11 generates a virtual image of the contents provided by the target device. In an embodiment, the virtual image of the contents may include contents information such as Representative Image and Title of the contents.

For example, as illustrated in FIG. 6A, a virtual image 72 of the contents may include the channel number of a broadcast channel provided by the target device such as a broadcast receiving device. In an embodiment, the virtual image 72 may further include the representative image of a broadcast program on the broadcast channel.

The control unit 11 generates a synthesized image by synthesizing the virtual image 72 and the actual image 71 of a target device captured by the camera unit 12, and may control the display unit 14 to display the synthesized image.

For example, as illustrated in FIG. 6A, an image 71 of a broadcast receiving device displayed on the display unit 14 of the remote control device 10 is an actual image captured by the camera unit 12, and images 72 located around the image 71 are virtual images generated by the control unit 11. The virtual images 72 correspond respectively to channels provided by the broadcast receiving device, and the user can detect a list of the provided channels through the virtual images 72 displayed around the actual image 71.

In an embodiment of the present invention, the contents may be plural and the display unit 14 may display virtual images corresponding to the plural contents in a predetermined pattern.

For example, as illustrated in FIG. 6A, the contents provided by the target device (e.g., the channels provided by a broadcast receiving device) may be plural and the display unit 14 may display virtual images 72 corresponding to the plural contents in a predetermined pattern such as a panorama pattern around the actual image 71.

FIG. 6A illustrates that the virtual images 72 are arranged horizontally around the actual image 71 of the target device. However, in embodiments, the virtual images 72 may be arranged vertically or diagonally around the actual image 71.

Figure 6B:
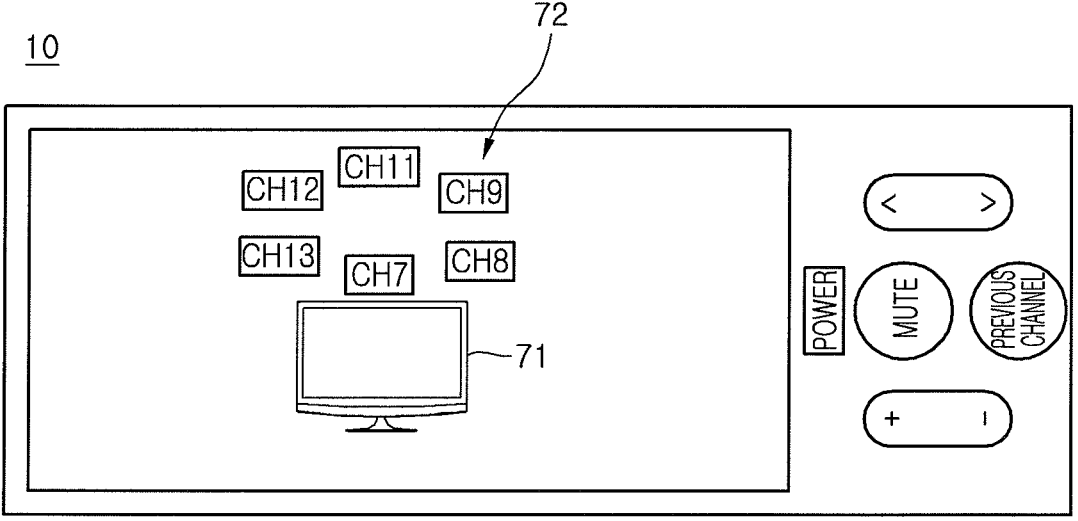

In an embodiment, as illustrated in FIG. 6B, the virtual images 72 of the contents may be arranged circularly around the actual image 71 of the target device so that the user can detect the virtual images 72 of the contents at eye. Other arrangements are possible as well.

Figure 6C:
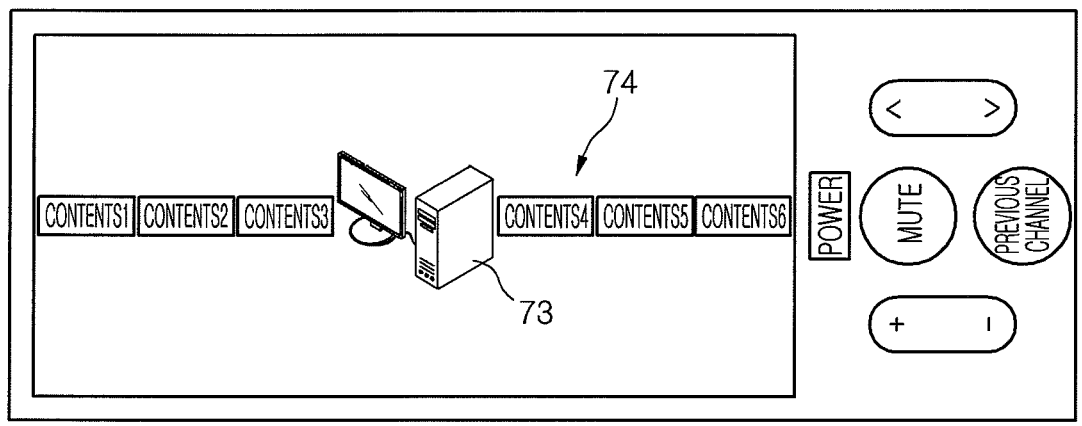

FIGS. 6A and 6B illustrate the case where the target device is a broadcast receiving device. However, the target device may be a computer as illustrated in FIG. 6C. In this case, the remote control device 10 may display a synthesized image of an actual image 73 of the computer and a virtual image 74 of contents provided by the computer (e.g., contents stored in the computer).

In an embodiment, the contents stored in the computer may be plural and the display unit 14 may display virtual images corresponding to the plural contents in a predetermined pattern around the actual image 73 of the computer.

The user input unit may receive a user input for control of the displayed virtual images, and the control unit 11 may control the virtual images to be controlled and displayed according to the received user input.

In an embodiment of the present invention, the user input unit may include at least one of a touchscreen, a keybutton and a motion sensor.

In an embodiment of the present invention, if the user input unit is a touchscreen, the touchscreen may detect a drag gesture of the user and the control unit 11 may move the virtual image 72 in the drag direction in response to the detected drag gesture.

Figure 7A:
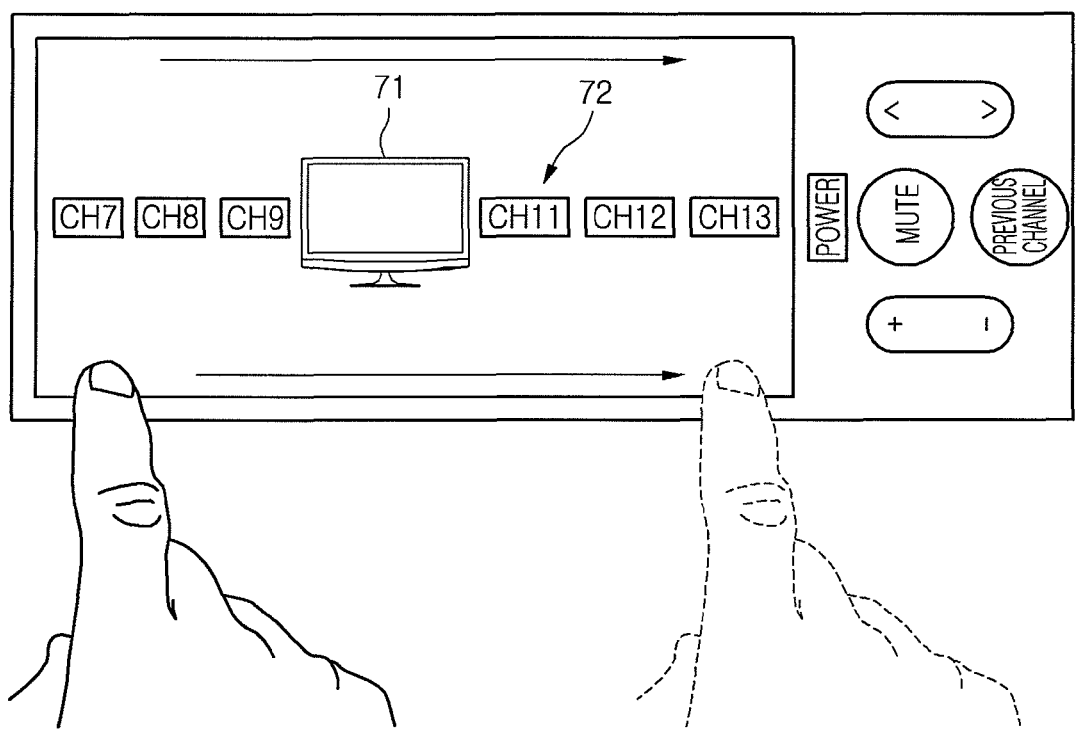

For example, as illustrated in FIG. 7A, the remote control device 10 may include a touchscreen as a user input unit. When the touchscreen detects a drag gesture of the user, the control unit 11 may move the displayed virtual image 72 in the drag direction in response to the detected drag gesture.

In result, channels may be sequentially scanned (i.e., browsed) as the virtual images 72 corresponding to the channels move in the drag direction. FIG. 6A illustrates virtual images 72 corresponding to channels CH7 to CH13. However, by the drag gesture illustrated in FIG. 7A, the remote control device 10 may sequentially browse other channels CH2 to CH6 as well as the channels CH7 to CH13.

In another embodiment, individual scenes from a stored program may be browsed and selected. In another embodiment, trailers or other excerpts of stored video and/or audio programs may be browsed and selected. In another embodiment, gestures other than drag may be used.

Thus, by inputting the above-described user input, the user can detect a list of contents provided by the target device more conveniently and intuitively.

In an embodiment of the present invention, if the user input unit is a keybutton and the user presses the keybutton, the control unit 11 may sequentially browse the virtual images 72 in response to the keybutton input.

In an embodiment of the present invention, if the user input unit is a motion sensor, the motion may detect a motion of the remote control device 10 and the control unit 11 may move the virtual images 72 in the motion direction of the remote control device 10.

Figure 7B:
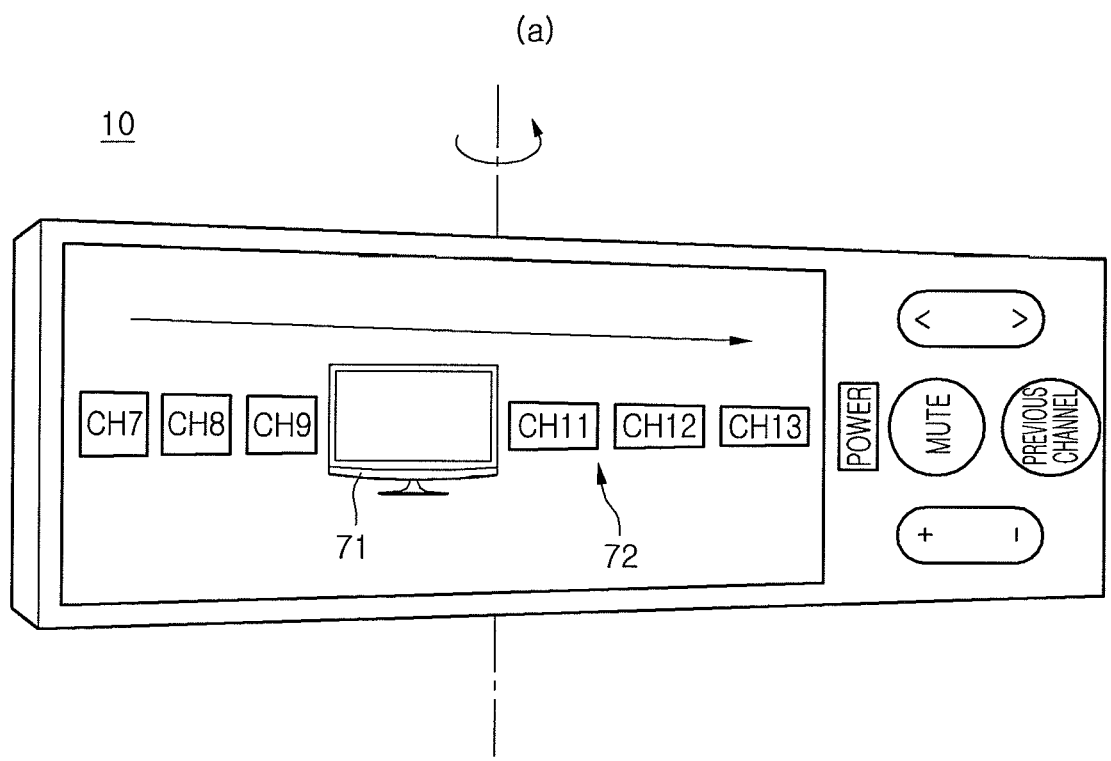
Figure 7B:
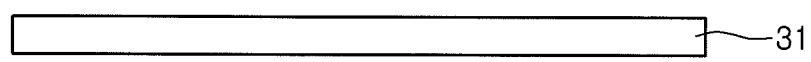
Figure 7B:
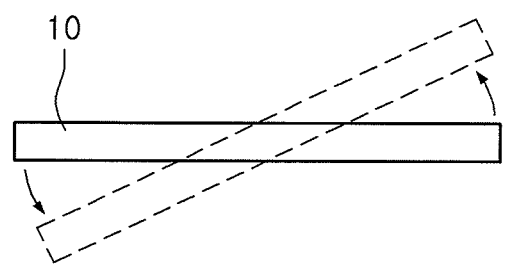

FIG. 7B is a diagram illustrating the situation where a virtual image moves in the motion direction of a remote control device 10, detected by a motion sensor, in accordance with an embodiment of the present invention. FIG. 7B(a) is a front view of the remote control device 10, and FIG. 7B(b) is a plan view of the remote control device 10 and the target device 31.

As illustrated in FIG. 7B, if the user tilts the remote control device 10 in a predetermined direction (e.g., in a counterclockwise direction), a motion sensor in the remote control device 10 may detect the tilting of the remote control device 10 and the control unit 11 may move the virtual images 72 in the tilting direction of the remote control device 10 (i.e., toward the right) in response to the detected tilting.

In result, like the case of FIG. 7A, the virtual images 72 are sequentially scanned and virtual images for other non-displayed contents are displayed on the display unit 14, so that the user can detect a list of the contents at eye.

In an embodiment, the motion sensor may include at least one of various sensors (e.g., inertial sensors, geomagnetic sensors, and acceleration sensors) that can detect the motion direction, the rotation direction and the tilting direction of the remote control device 10.

FIG. 7B illustrates the case where the remote control device 10 is tilted in the counterclockwise direction and the virtual images 72 are moved to the right to browse the contents.

In another embodiment, the remote control device 10 may be tilted in the clockwise direction and the motion sensor may detect the clockwise tilting of the remote control device 10.

If the remote control device 10 is tilted in the clockwise direction, the motion sensor in the remote control device 10 may detect the tilting direction of the remote control device 10 and the control unit 11 may move the virtual images 72 in the tilting direction of the remote control device 10 (i.e., toward the left) in response to the detected tilting direction to browse the contents.

In this case, the virtual images 72 for the channels are moved to the left and virtual images for other channels than the displayed channels CH7 to CH13 of FIG. 6A are displayed on the display unit 14, so that the user can detect a list of the channels at eye.

Alternatively, a user may tilt the remote control 10 up/down or left/right to browse. The degree of tilt and/or the speed of tilt may control the speed of browsing. A rapid double tilt or other gesture may be used to jump a predetermined distance or to an end of a display.

In an embodiment of the present invention, without receiving a separate user input through the user input unit, the remote control device 10 may analyze the change pattern of an actual image, captured by the camera unit 12, to control the virtual images.

Figure 7C:
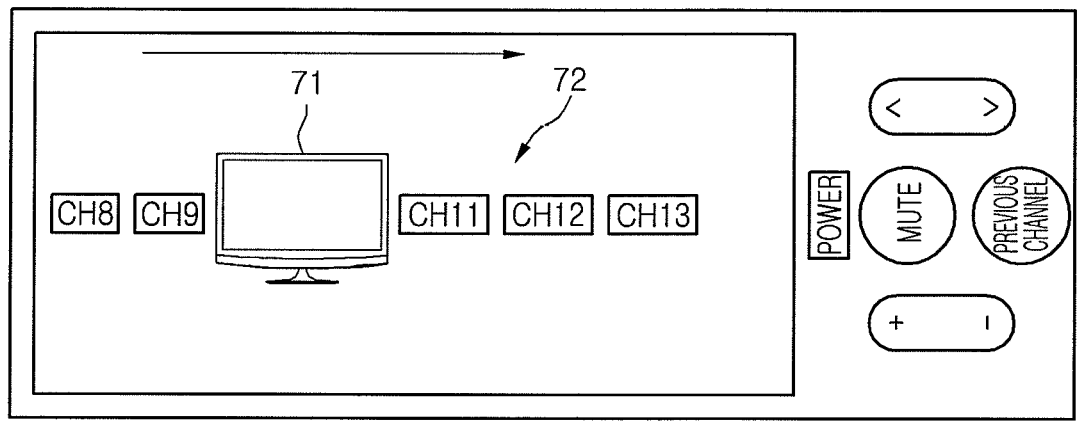
Figure 7C:
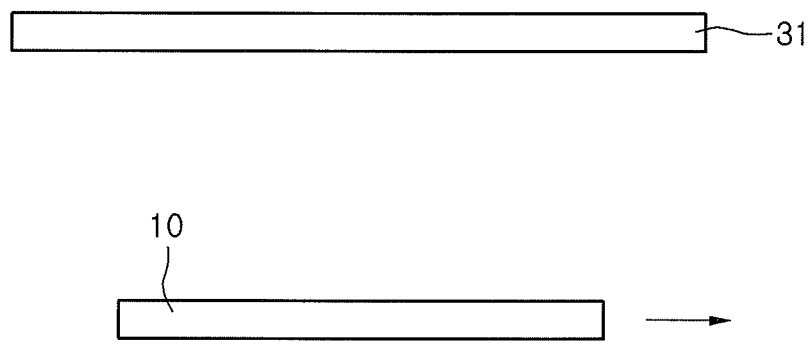

As illustrated in FIG. 7C, if the user moves the remote control device 10 to the right, an actual image 71 of the target device captured by the camera unit 12 moves to the left on the display unit 14.

In this case, the control unit 11 may analyze the change pattern of an image captured by the camera unit 12 (e.g., an actual image of the target device) to determine the motion direction of the remote control device 10. As illustrated in FIG. 7C, the control unit 11 may determine that the remote control device 10 moves to the right, by detecting that an actual image 71 of the target device (among the images captured by the camera unit 12) moves to the left.

Thereafter, the control unit 11 may move the virtual images in the determined motion direction. That is, as illustrated in FIG. 7C, the control unit 11 may move the virtual images 72 to the right (i.e., the motion direction of the remote control device 10) to browse the channels.

In this manner, without receiving a user input through the user input unit, the remote control device 10 of the present invention may analyze the captured image of the camera unit 12 to move the virtual images 72.

In an embodiment of the present invention, the user input unit may receive a user input for selection of a virtual image of desired contents and the control unit 11 may generate a control signal to execute the contents corresponding to the selected virtual image in the target device.

Figure 7D:
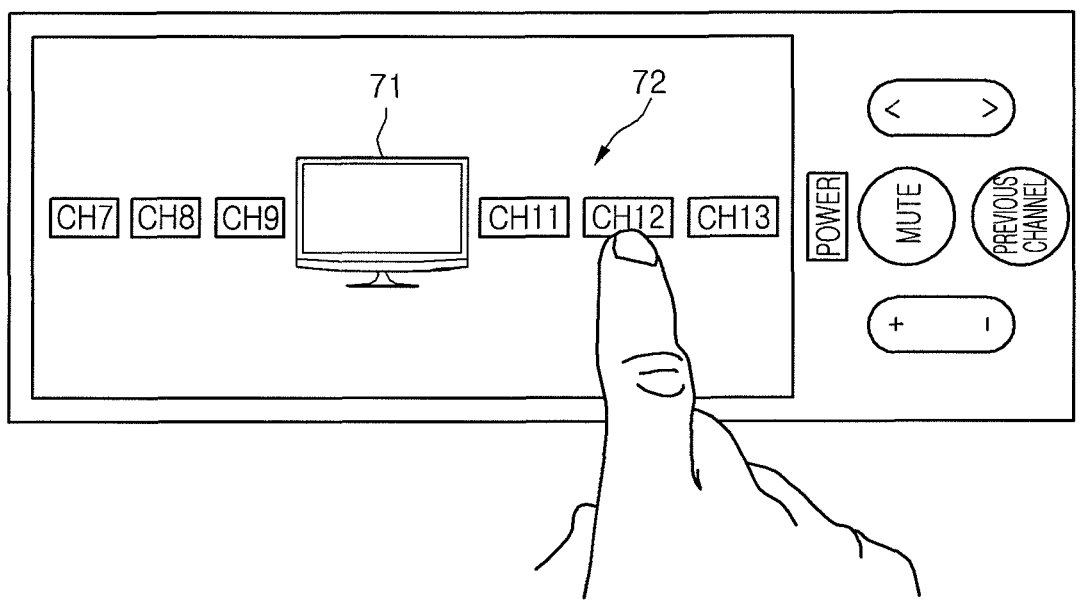

For example, as illustrated in FIG. 7D, if the user input unit is a touchscreen, the touchscreen may detect a touch gesture of the user for touching one of the virtual images 72.

In response to the detected touch gesture, the control unit 11 may generate a control signal to execute the contents corresponding to the touched virtual image (e.g., the channel CH12 in FIG. 7D) in the target device.

Thereafter, the communication unit 13 may transmit the generated control signal to the target device, so that the target device may display the channel selected by the user.

In an embodiment, the user input for selection of the virtual image may be a gesture for locating a desired virtual image at a desired point of the display unit 14.

For example, as illustrated in FIG. 7D, if the user locates a desired virtual image (e.g., a virtual image of the channel CH12) at the actual image 71 of the target device through a drag-and-drop gesture instead of through a touch gesture for the desired virtual image, the control unit 11 may generate a control signal to execute the contents corresponding to the desired virtual image in the target device.

In an embodiment, in FIG. 7B, if the tilting of the remote control device 10 is not detected by the motion sensor any more, i.e., if the remote control device 10 returns to the ante-tilting state, the control unit 11 may stop the motion of the virtual images 72 and generate a control signal to execute the contents corresponding to the virtual image, located at a desired point of the display unit, in the target device.

In other words, if the remote control device 10 returns to the ante-tilting state, the control unit 11 may select the virtual image that is located at a desired point of the display unit (e.g., a display point of the actual image 71 of the target device) to overlap the actual image 71 of the target device. Thereafter, the control unit 11 may generate a control signal, which is to execute the contents corresponding to the selected virtual image in the target device, and transmit the generated control signal to the target device.

In result, the user can not only browse the contents provided by the target device, but also select desired contents to execute the same in the target device.

In an embodiment of the present invention, the communication unit 13 may further receive information about an external device connected to the target device, and the display unit 14 may further display a virtual image of the external device.

Figure 8A:
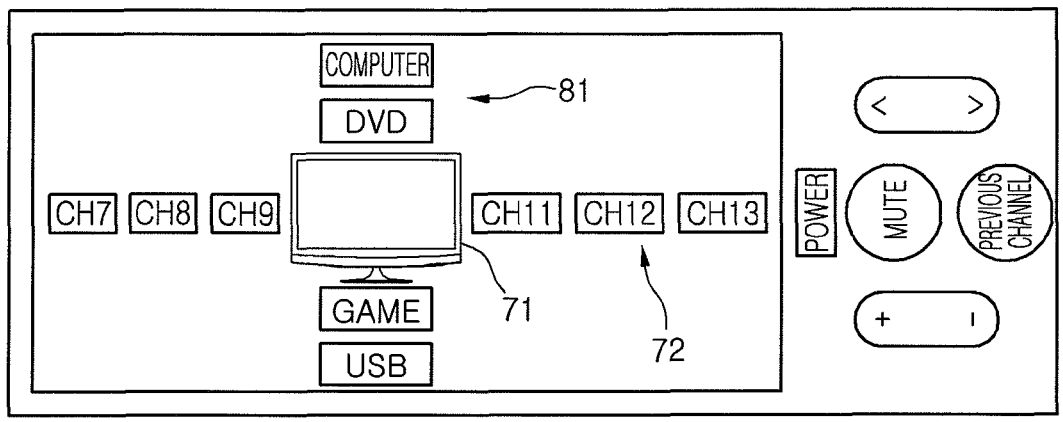

For example, as illustrated in FIG. 8A, the remote control device 10 of the present invention may further provide a virtual image 81 of an external device connected to the target device, in addition to the virtual image 72 of the contents provided by the target device.

In an embodiment, the virtual image 72 of the contents and the virtual image 81 of the external device may be displayed together. However, the present invention is not limited thereto and the respective virtual images may be displayed separately.

The communication unit 13 receives information about an external device connected to the target device. For example, if the target device is a broadcast receiving device, the communication unit 13 may receive information about external devices (e.g., DVD players, games, computers, and USB memories) that are connected in wired or wireless manner to the broadcast receiving device. The received information about the external device may include Type of the external device, Title of the contents provided by the external device, Genre, Play Time, Rating Level, and Representative Image.

Thereafter, the control unit 11 generates a virtual image 81 of the external device on the basis of the received information about the external device. Thereafter, the control unit 11 synthesizes the virtual image 81 of the external device and the actual image 71 of the target device and controls the synthesized image to be displayed on the display unit.

In result, through the remote control device 10, the user can easily detect the external device connected to the target device.

In an embodiment of the present invention, if the external device is plural, the display unit 14 may display virtual images corresponding to the plural external devices in a predetermined pattern.

For example, as illustrated in FIG. 8A, the display unit 14 may arrange the virtual images 81 corresponding to the external devices vertically in a panorama pattern around the actual image 71.

In embodiments, like the case of FIGS. 6A and 6B, the virtual images 81 may be arranged not only vertically but also horizontally or circularly around the actual image 71 of the target device. Other arrangements are also possible.

In an embodiment, if the virtual image 72 of the contents provided by the target device and the virtual image 81 of the external device are simultaneously provided, the remote control device 10 may display the virtual images 72 of the contents and the virtual images 81 of the external devices in different arrangement patterns (e.g., a horizontal panorama pattern for the virtual images 72 and a vertical panorama pattern for the virtual images 81) as illustrated in FIG. 8A.

In an embodiment of the present invention, the user input unit may receive a user input for motion of the virtual image 81 of the external device and the control unit 11 may move the virtual image 81 of the external device in response to the user input.

The motion of the virtual image 81 of the external device is similar to the motion of the virtual image 72 of the contents described with reference to FIGS. 7A to 7C.

Figure 8B:
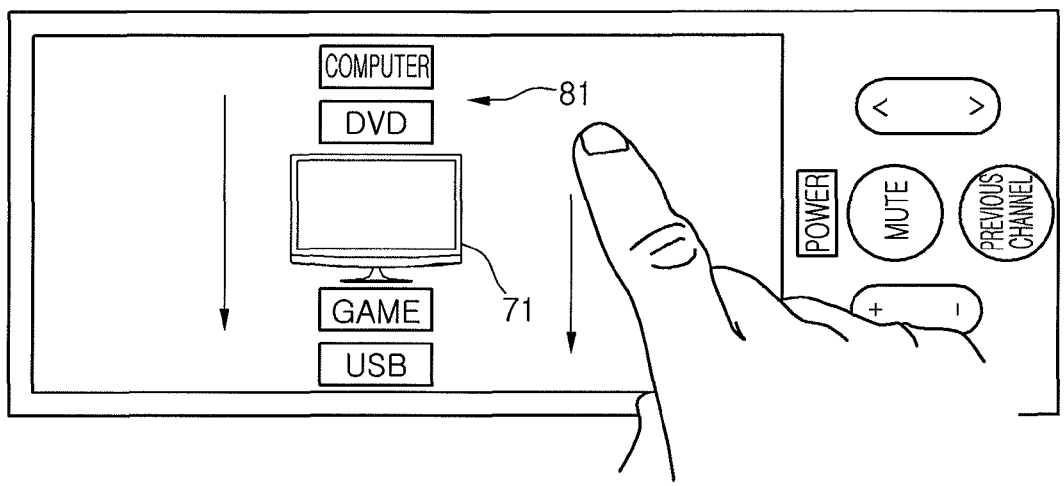

For example, as illustrated in FIG. 8B, if the user input unit is a touchscreen and when the touchscreen detects a drag gesture of a certain direction, the control unit 11 may move the virtual image 82 of the external device in the drag direction in response to the detected drag gesture.

Figure 8C:
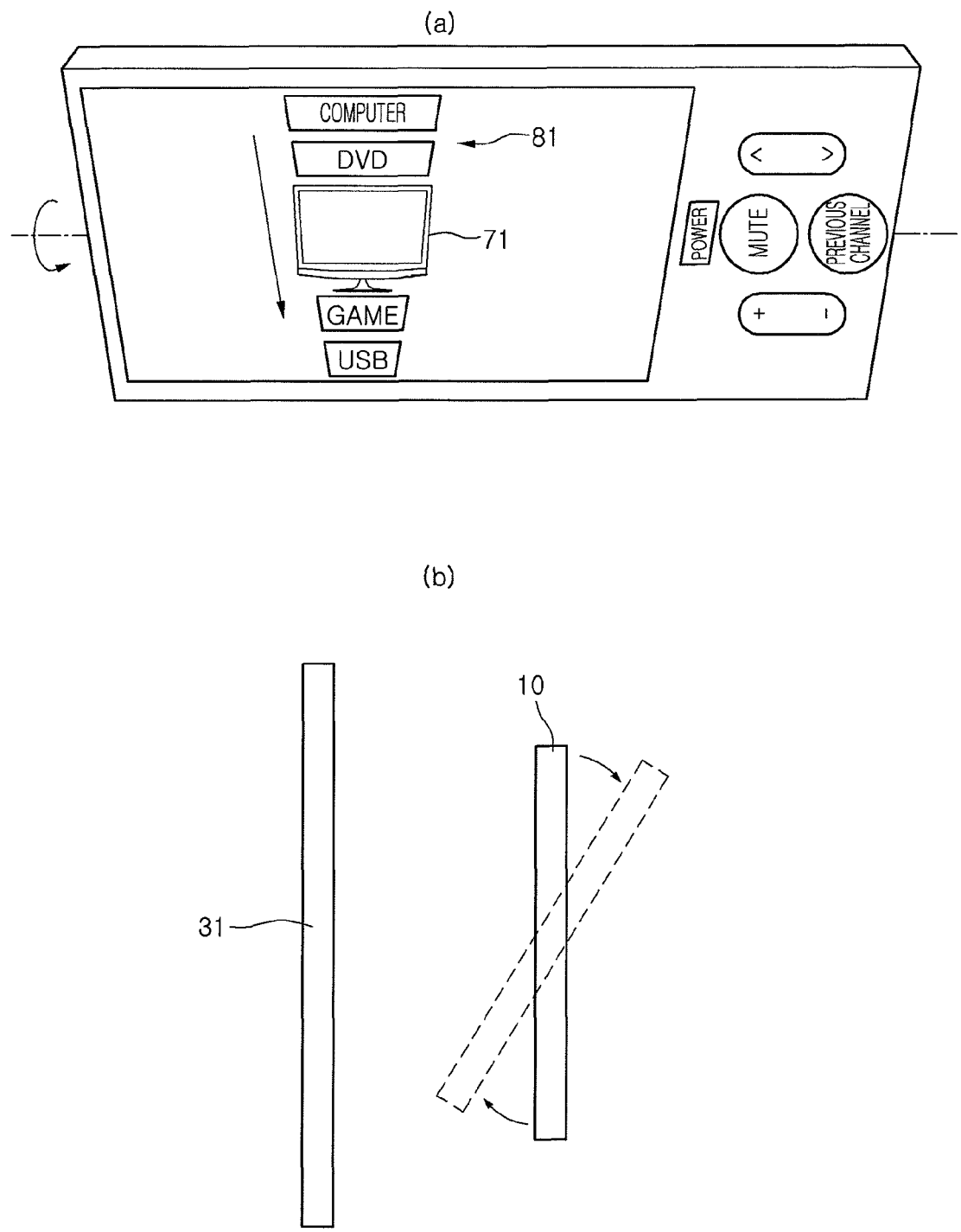

Also, as illustrated in FIG. 8C, if the user input unit is a motion sensor and when the motion sensor detects a motion of the remote control device 10, the control unit 11 may move the virtual image 82 of the external device in the motion direction of the remote control device 10 in response to the detected motion of the remote control device 10.

For example, as illustrated in FIG. 8C, if the user tilts the remote control device 10 in a downward direction, a motion sensor in the remote control device 10 may detect the tilting of the remote control device 10 and the control unit 11 may move the virtual image 81 of the external device in the tilting direction (i.e., in the downward direction) in response to the detected tilting.

Likewise, if the remote control device 10 is tilted in an upward direction, the motion sensor may detect the tilting of the remote control device 10 and the control unit 11 may move the virtual image 81 of the external device in the tilting direction (i.e., in the upward direction) in response to the detected tilting.

In an embodiment, the remote control device 10 may receive the motion direction of the virtual image 81 inputted through a keybutton and the control unit 11 may move the virtual image 81 of the external device in the inputted motion direction.

In an embodiment, like the case of FIG. 7C, the remote control device 10 may determine a motion direction of the remote control device 10 by analyzing a change pattern of an image captured by the camera unit 12, and may move the virtual image 81 of the external device in the motion direction.

In result, the remote control device 10 of the present invention can sequentially move/browse the virtual images 81 of the external devices, so that the user can detect the external devices connected to the target device at eye.

In an embodiment of the present invention, the user input unit may receive a user input for selection of a virtual image of a desired external device and the control unit 11 may generate an external input conversion signal for controlling the target device to output the output signal of the external device corresponding to the selected virtual image.

Figure 9A:
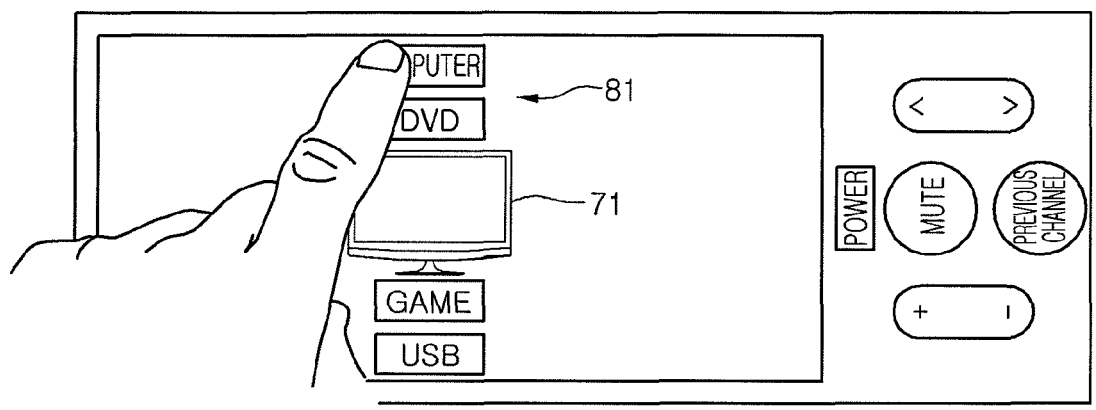

For example, as illustrated in FIG. 9A, when a touch input for touching a desired virtual image 81 (e.g., a virtual image of a computer) is detected through the touchscreen, the control unit 11 may generate an external input conversion signal for controlling the target device to output the output signal of the external device (e.g., the computer) corresponding to the selected virtual image in response to the detected touch input.

The communication unit 13 may transmit the generated external input conversion signal to the target device, and the target device may receive the external input conversion signal to convert the external input to output the output signal of the selected external device (e.g., the computer).

Like the virtual image 72 of the contents, the virtual image 81 of the external device may be selected through a drag-and-drop operation or through the keybutton. If the remote control device 10 returns to the ante-tilting state, the virtual image of the external device located at a desired point of the display unit may be selected to generate the external input conversion signal.

In an embodiment of the present invention, when the external input conversion signal is transmitted to the target device, the communication unit 13 may receive information about the contents provided by the external device.

Thereafter, the control unit 11 generates a virtual image of the contents provided by the external device on the basis of the received contents information. Thereafter, the control unit 11 may control the display unit to display a synthesized image of the actual image 71 of the target device and the virtual image of the contents provided by the external device.

Figure 9B:
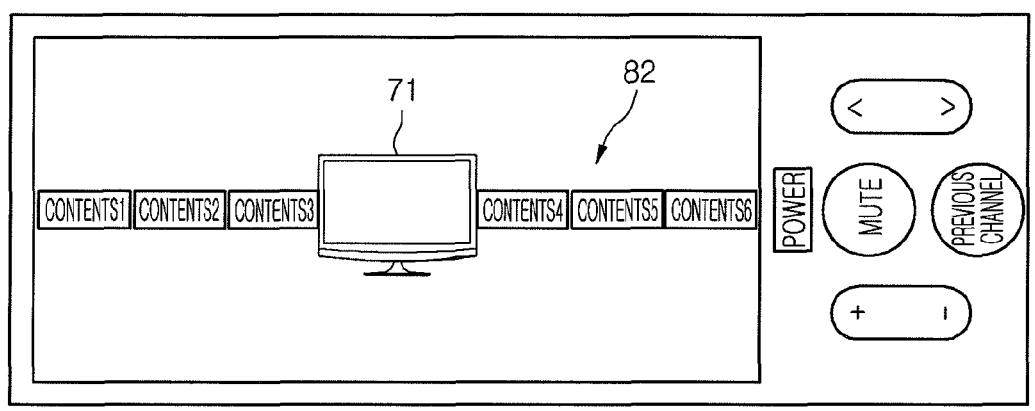

For example, as illustrated in FIG. 9B, when the external input conversion signal is transmitted to the target device, the communication unit 13 may receive information about the contents provided by the selected external device (i.e., the computer of FIG. 9A). The control unit 11 may generate a virtual image 82 of the contents provided by the computer on the basis of the received contents information and may control the display unit to display a synthesized image of the virtual image 82 and the actual image 71 of the target device.

In result, the virtual image 82 of the contents provided by the computer is displayed instead of the virtual image of the contents provided by the target device (i.e., the virtual image 72 of the channel), so that the user can browse the contents provided by the computer through the input of FIGS. 7A to 7D to execute desired contents in the target device.

In an embodiment of the present invention, the user input unit may further receive a user input for continuously displaying the synthesized image of the actual image 71 and the virtual image 72, and the control unit 11 may control the display unit to display the synthesized image continuously regardless of the orientation direction of the camera unit 12.

Figure 10:
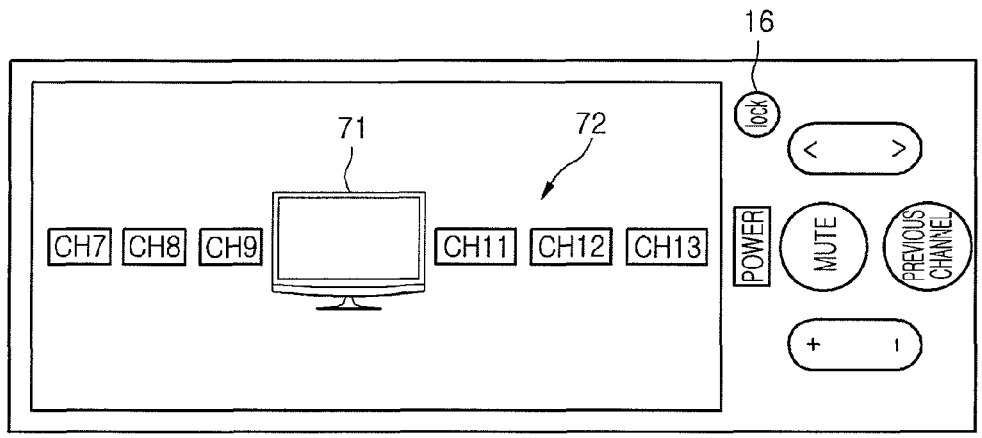

For example, as illustrated in FIG. 10, the remote control device 10 may have a lock button 16 at its outside and may receive a user input from the user to continuously display the actual image 71 of the target device and the virtual image 72 of the contents.

That is, as illustrated in FIG. 10, if the camera unit 12 captures an image of an image receiving device, the control unit 11 may control the display unit to display a synthesized image of an actual image 71 of the image receiving device and a virtual image 72 of the contents provided by the image receiving device. If the user presses the lock button 16, the control unit 11 may control the display unit to display the actual image 71 and the virtual image 72 continuously regardless of the orientation direction of the camera unit 12.

In result, even when the user presses the lock button and orients the remote control device 10 in a certain direction, the remote control device 10 can continuously display the actual image and the virtual image that are displayed at the press of the lock button 16.

Also in this case, the communication unit 13 may receive contents information from the target device and may transmit a control signal to the target device.

Thus, even without orienting the remote control device 10 toward the target device, the user may input the input of FIGS. 7A to 7D to browse the contents provided by the target device and may select/display desired contents.

In an embodiment of the present invention, the user input unit may receive a zoom command for zooming in/out the synthesized image, and the control unit 11 may control the display unit to display the synthesized image in a zoom-in/out mode according to the zoom command.

Figure 11:
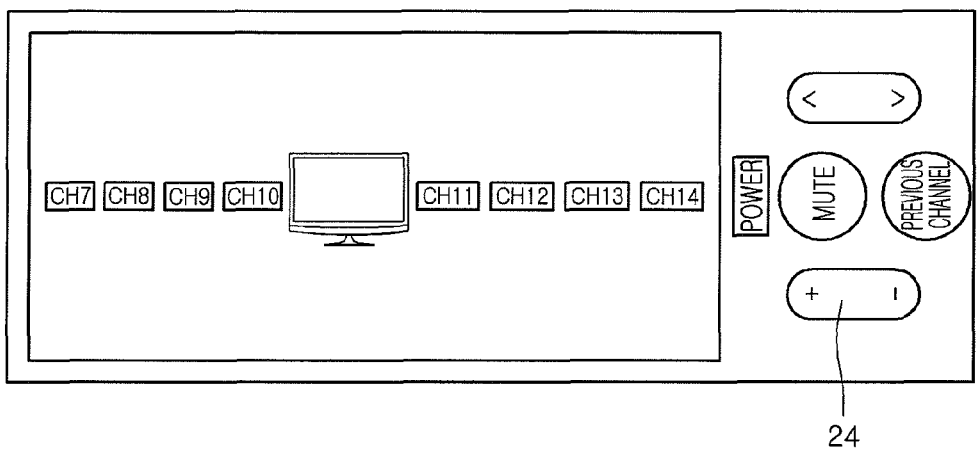

In an embodiment, the zoom command for zooming in/out the synthesized image may be inputted through the keybutton. For example, as illustrated in FIG. 11, if a '−' button of the zoom button 24 of the remote control device 10 is pressed, the synthesized image of the actual image 71 and the virtual image 21 may be zoomed out.

On the other hand, if a '+' button is pressed, the synthesized image may be zoomed in.

In an embodiment, the zoom command may be a multi-touch on the touchscreen. For example, if the user touches the touchscreen with two fingers and increases the distance between the two fingers, the touchscreen may detect a multi-touch gesture and the control unit 11 may zoom in the synthesized image in response to the multi-touch gesture.

In another embodiment of the present invention, unlike the embodiment of selecting the external device through the virtual image 81 of the external device as illustrated in FIG. 9A, an external device may be selected through an actual image of the external device.

In another embodiment of the present invention, the user input unit receives an external input conversion command for transmitting the output signal of an external device to a target device. Thereafter, the control unit 11 sets the remote control device 10 to an external input conversion mode in response to the external input conversion command.

In this case, in order to select an external device to transmit an output signal to the target device, the user orients the remote control device 10 toward the external device.

For example, in order to transmit the output signal of a computer to the target device, the user may orient the remote control device 10 toward the computer.

In this case, the camera unit 12 may capture an image of the external device (i.e., the computer), and the display unit 14 may display a captured actual image 73 of the computer.

A message displayed at a top portion of FIG. 12A is to inform the user that the remote control device 10 is in an external input conversion mode.

Thereafter, the user may input a user input to select the captured actual image 73 of the external device.

For example, as illustrated in FIG. 12B, if the user touches the actual image 73 of the computer displayed on a touchscreen, the touchscreen may detect a touch input of the actual image 73. In response to the touch input, the control unit 11 may generate an external input conversion signal to transmit the output signal of an external device (i.e., a computer) corresponding to the touched actual image 73 to the target device. The external input conversion signal may be transmitted through the communication unit 13 to the target device.

The target device may receive the external input conversion signal. Accordingly, the selected computer may be set as an external device to receive/output an output signal of the computer.

In an embodiment, if the camera unit 12 captures an image of a desired external device (i.e., a computer) for a predetermined time, the control unit 11 may automatically select the desired external device to generate an external input conversion signal to transmit an output signal of the external device to the target device.

According to the above-described embodiment, a desired external device can be photographed for a predetermined time without an additional user input for selection of an external device, thereby making it possible to transmit/output an output signal of the photographed external device.

In an embodiment, the remote control device 10 may receive a user input for dragging and dropping an actual image 73 of a desired external device to a display point of an actual image 71 of a target device, to transmit/output an output signal of the external device to the target device.

Figure 12C:
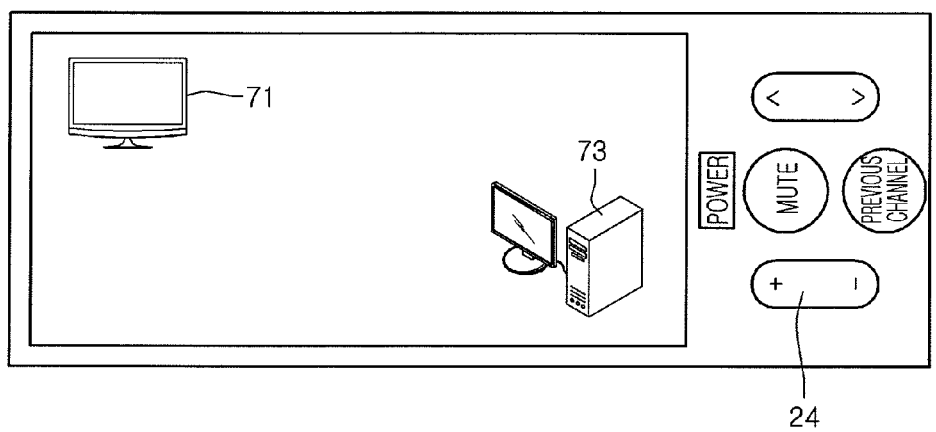
Figure 12D:
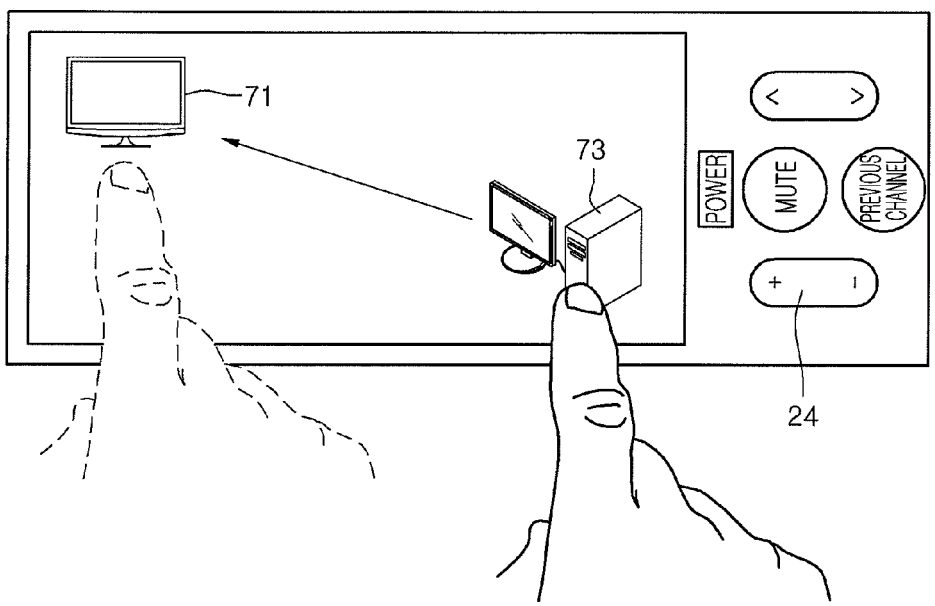

For example, as illustrated in FIG. 12C, the user may control the remote control device 10 to display both of an image of a desired external device and an image of a target device on the display unit 14. In this case, the user may input the zoom command to zoom in/out the image displayed on the display unit 14.

When the display unit 14 displays an actual image 73 of the external device and an actual image 71 of the target device, the user may drag and drop the actual image 73 of the external device to the actual image 71 of the target device.

In this case, the touchscreen may detect the drag-and-drop gesture and the control unit 11 may transmit/output an output signal of the external device (e.g., the computer) to the target device in response to the detected drag-and-drop gesture.

The previously described equipment connection capabilities may be adapted for devices other than entertainment devices as well as for video and/or audio teleconferencing. In teleconferencing, virtual images of potential conference participants/stations/devices may be displayed and connected to a hub device by one of the methods described above.

The previous embodiments have addressed various gestures for both browsing and selecting, such as drag, tilt, drag-and-drop and multi-touch. However, other gestures are possible. Alternative gestures such as shake, circle and others may be used for both browsing and selecting, or may be matched to other commands executed by the remote control device. These gestures may be pre-set by the manufacturer and/or may be set or adjusted by a user.

Figure 13:
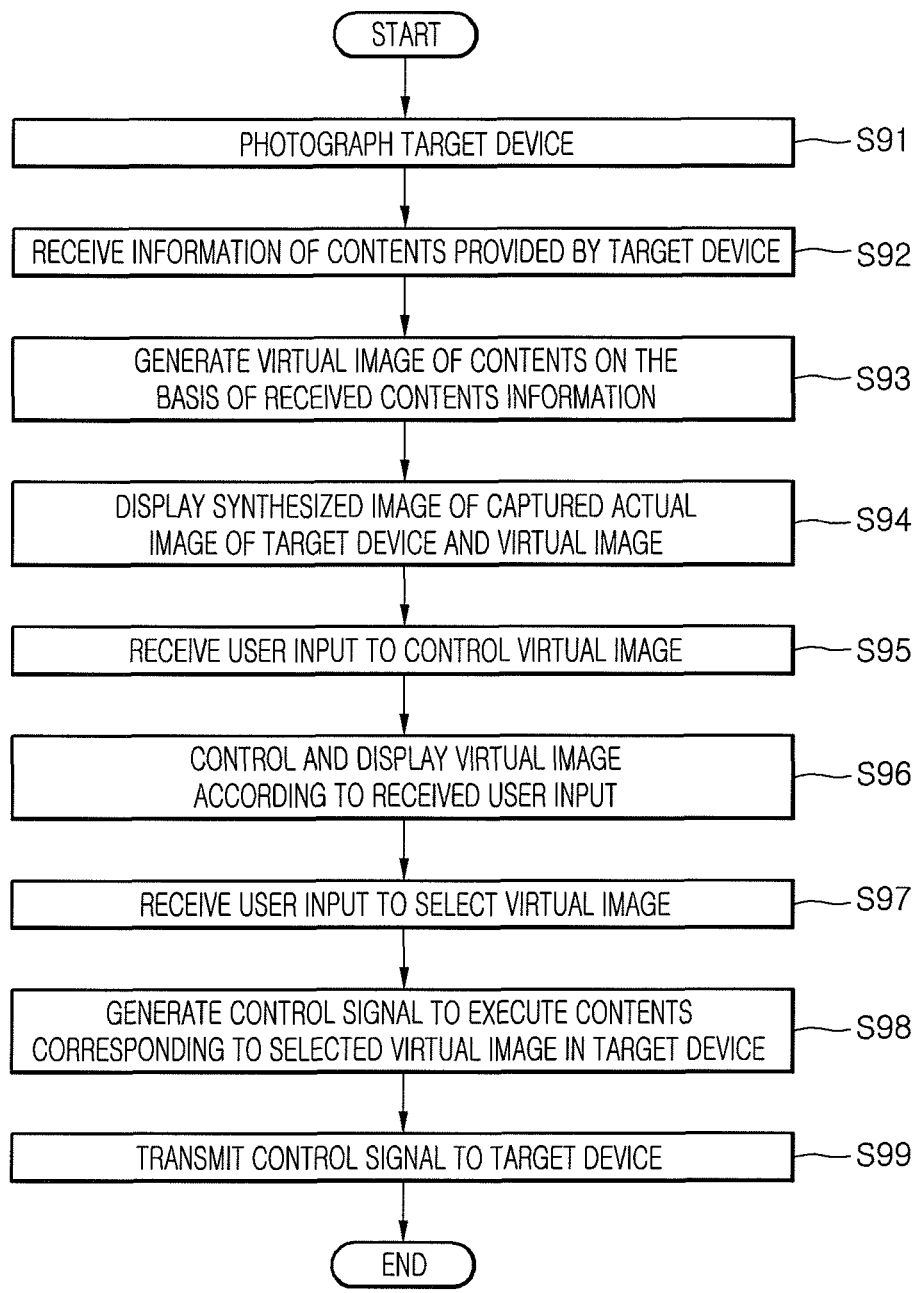
FIG. 13 is a flow diagram illustrating a remote control method in accordance with an embodiment of the preset invention.

FIG. 13 is a flow diagram illustrating a remote control method in accordance with an embodiment of the preset invention.

Referring to FIG. 13, a step S91 photographs a target device. For example, the camera unit 12 of the remote control device 10 of the present invention photographs the target device to provide an actual image of the target device.

In an embodiment, the target device may be a broadcast receiving device that provides broadcast programs.

A step S92 receives information of contents provided by the target device. For example, the communication unit 13 receives information of contents provided by the target device. In an embodiment, if the target device is a broadcast receiving device, the contents may be broadcast programs of channels provided by the broadcast receiving device.

In an embodiment, the contents information may include information about the channel number of the channel, a broadcasting station, and the representative image of the broadcast program provided on the channel.

A step S93 generates a virtual image of the contents on the basis of the received contents information. For example, on the basis of the received contents information, the control unit 11 generates a virtual image of the contents provided by the target device.

A step S94 displays a synthesized image of the virtual image and the captured actual image of the target device. For example, the control unit 11 controls the display unit to display a synthesized image of the generated virtual image and the actual image of the target device captured by the camera unit 12.

In an embodiment, if the contents are plural, virtual images corresponding to the plural contents may be arranged and displayed in a predetermined pattern.

A step S95 receives a user input to control the virtual image. For example, a user input may be received through the user input unit to move the virtual image or to zoom in/out a synthesized image of the virtual image and the actual image.

In an embodiment, the user input unit may include at least one of a touchscreen, a keybutton and a motion sensor.

A step S96 controls and displays the virtual image according to the received user input. For example, according to the user input, the control unit 11 may move the virtual image or may zoom in/out the image displayed on the display unit.

In result, the user can easily detect a list of the contents provided by the target device (e.g., the channels provided by the broadcast receiving device).

A step S97 receives a user input to select the virtual image. For example, after moving the displayed virtual images to browse the channels provided by the broadcast receiving device, the user inputs a user input to select a desired channel.

A step S98 generates a control signal to execute the contents corresponding to the selected virtual image in the target device. For example, when the virtual image of a desired channel is selected, the control unit 11 generates a control signal to execute the channel corresponding to the selected virtual image in the broadcast receiving device.

A step S99 transmits the control signal to the target device.

According to the present invention, the user can browse the contents provided by the target device (e.g., the channels provided by the broadcast receiving device) intuitively and easily through the remote control device 10.

Also, the user can convert the channel of the broadcast receiving device to a desired channel by selecting a virtual image of the channel displayed on the remote control device 10.

In an embodiment of the present invention, when the remote control device 10 is oriented toward an external device, information of the external device may be generated and displayed as a virtual image. This embodiment also may be implemented when the remote control device 10 is in a control mode.

Figure 14:
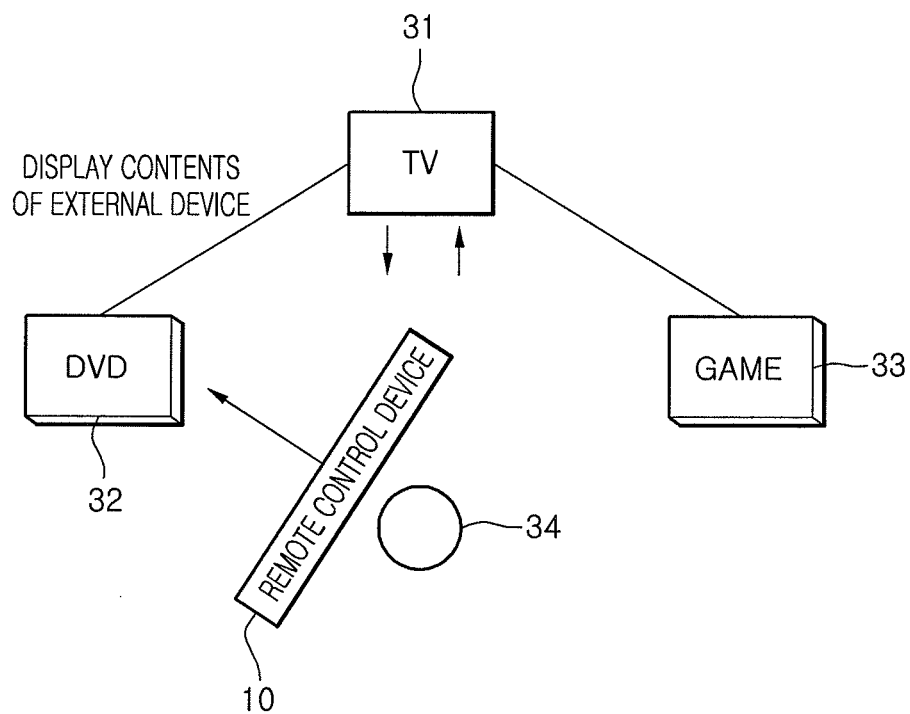
FIGS. 14 and 15 are diagrams illustrating an external device control method in accordance with an embodiment of the preset invention.
Figure 15:
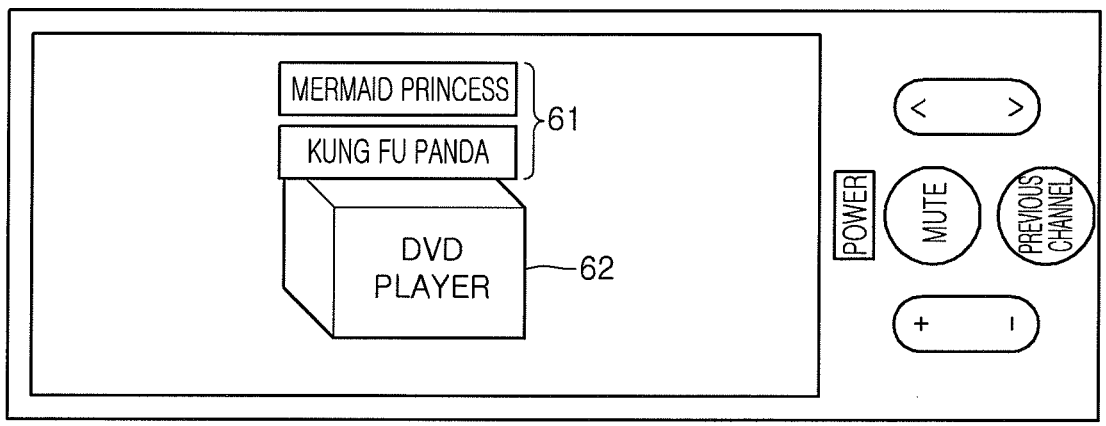

It is assumed that the remote control device 10 is oriented toward an external device (e.g., a DVD player 32) as illustrated in FIG. 14. The camera unit 12 of the remote control device 10 captures an image of the DVD player 32, and the control unit 11 analyzes the captured image to determine that the remote control device 10 is oriented toward the DVD player 32.

The control unit 11 of the remote control device 10 may receive a playable contents list, stored in the DVD player 32, from the DVD player 32 and may display the playable contents list as a virtual image 61 around an image 62 of the DVD player 32. For example, if MERMAID PRINCESS and KUNG FU PANDA are included in a DVD title inserted into the DVD player 32, the control unit 11 may receive the titles of MERMAID PRINCESS and KUNG FU PANDA from the DVD player 32 to generate a virtual image. Thereafter, the virtual image 61 may be displayed around the actual image 62 of the DVD player 32. From the displayed image, the user can easily detect a list of contents playable by the DVD player 32.

Also, the virtual image 61 of the playable contents list is displayed around the DVD player image 62, thereby enabling the user to intuitively detect the contents.

The virtual image 61 of the contents list may include texts such as the titles of the contents and may include the cover image of the DVD title, characters representing the contents, or advertisement images.

In an embodiment of the present invention, the remote control device 10 may be used to control the target device to which the remote control device 10 is oriented. For example, this embodiment may be implemented when the remote control device 10 is in a control mode.

It is assumed that the remote control device 10 is oriented toward the TV 31 as illustrated in FIG. 3 or 4. For example, it is assumed that the camera unit 12 of the remote control device 10 is oriented toward the TV 31. When the remote control device 10 is oriented toward the TV 31 and if the user presses a button 65 at one side of the remote control device 10, a menu 66 may be displayed on the display unit 14 of the remote control device 10 to control the TV 31, as illustrated in FIG. 16.

The control menu of the TV 31 may include Screen Control, Reserved Recording, Volume Control, and Time Control.

The above operation may be similarity performed on other external devices 32 and 33, as well as on the TV 31.

The user may dispose the button 65 at a typical camera photograph button position of the remote control device 10. The menu of the photographed target device may be displayed when the user presses the button 65 like the pressing of a camera photograph button while orienting the remote control device 10 like the photographing of the target device by the camera.

During the display of the menu 66, the user may touch the display unit to select the menu and to control the menu of the TV 31.

In an embodiment of the present invention, when the positions of the target devices are inputted into the remote control device 10, the target devices can be controlled even without orienting the camera of the remote control device 10 toward the target devices. In this case, the remote control device 10 is equipped with a motion sensor.

As illustrated in FIG. 17, a user 34 controls the camera of the remote control device 10 to scan the target devices, i.e., the external devices 32 and 33. The relative positions and images of the scanned target devices are stored in a memory installed in the remote control device 10. The remote control device 10 may display the images and positions on the display unit.

In this state, when the user moves the remote control device 10 horizontally, the motion sensor in the remote control device 10 detects the motion to display the motion on the display unit of the remote control device 10.

That is, even when the remote control device 10 is not oriented toward a desired target device, the motion applied to the remote control device 10 by the user may be detected using the motion sensor and the displayed target device may be changed according to the detected motion. The same operations as the above-described embodiment may be implemented according to the displayed target device.

Once the remote control device 10 photographs the target devices to store the relative positions and images of the target devices, and even when the remote control device 10 is not oriented toward the target device or even when the camera unit of the remote control device 10 is disabled, this embodiment can implement the operations of various embodiments described above.

According to this embodiment, the user need not orient the remote control device 10 toward a desired target device in order to control the target devices. The remote control device 10 has only to be within the range for wireless communication with the desired target devices.

For example, a user may decide to browse plural digital audio files remote control device 10. The user may lie down with the remote control device 10 pointed to the ceiling and browse an audio data storage within range by scrolling through images and/or audio clips with various predefined gestures (e.g., tilt up for back browse, tilt down for forward browse.)

The remote control device 10 according to the present invention may be any electronic device that is equipped with a camera, a display, a short-range communication module and suitable software. For example, if a mobile terminal such as a mobile phone is equipped with suitable software, the mobile terminal may be used as the remote control device 10. In particular, a touchscreen phone is suitable for use as the remote control device 10.

In the previously described embodiments, an actual and a synthesized image were described. In some embodiments, the synthesized image may be a 3-dimensional (3-D) image. Alternatively, the synthesized image may be a digital image stored by the user or stored by the manufacturer. For example, a user may create (e.g., photograph) or download an image and associate this image with the controlled device.

In the previously described embodiments related to television channel browsing, channel browsing through a main display was discussed. However, the remote control device 10 may also control channels or other inputs to a Picture-in-Picture (PIP) or other split screen display. The remote control unit may also be used to turn such secondary displays ON or OFF.

The previously described embodiments are not limited to interactions with individual devices at a time. For example, a user may use the remote control device 10 to interact with multiple devices in parallel or in series, such that files (e.g., movie files or audio files) from different devices are queued for playing. Alternatively, the remote control device 10 to interact with multiple devices in parallel or in series in a showroom such that a shopper or store employee may control multiple devices. When controlling multiple devices, control operations of remote control device 10 may be associated with individual components either via line-of-sight discrimination or via passwords or registration keys or other techniques that would prevent a user from inadvertently controlling device A when device B was the intended device. In the alternative, it is also possible for a user to use remote control device 10 to control multiple devices simultaneously.

When the target device is a home appliance such as washer, dryer, air conditioner, refrigerator and other kitchen appliance, the remote control device 10 may control ON/OFF operations, as well as operations specific to the device such as a time, temperature, a cycle, a mode, an alarm, etc.

When the target device is a computer or other personal information processing device, the remote control device 10 may control ON/OFF operations, as well as operations specific to the device such as a file search/retrieval, file opening/closing, scrolling, highlighting, cut-and-pasting, emailing, texting, etc. For example, by using one or more of the previously described capabilities, a user may use the remote control device 10 to turn on a computer, open a folder, peruse file names, and cause a selected file to be opened.

When the target device is a vending machine, a user may use remote control 10 to determine the contents, prices and amounts of items. For example, a user may interrogate a drink machine to determine how many items of different types are available. The user may select one item for dispensing, with payment made via information stored in a SIM card in the mobile terminal 100.

If the target device is an automobile, the remote control 10 may obtain diagnostic information of a personal vehicle, or sales or technical information from one or more automobiles at a showroom or other sales location.

In preceding embodiments, options for interactions with multiple devices via Bluetooth or related technologies were identified. In these, and perhaps other, scenarios, it is possible to take measures to avoid inadvertent or malicious equipment operations by a third party (e.g., a neighbor in a nearby apartment who may inadvertently control another's television.) It is possible to pre-register devices with specific remote controllers. It is also possible for a user to enable/disable the controllable devices for a predefined or undefined period of time. Also, various forms of encryption may be used to protect unwanted interactions. Alternatively, as in the previously described vending machine or device/automobile showroom embodiments, selected controllable devices may be set up for open access by any remote control device 10.

Figure 18:
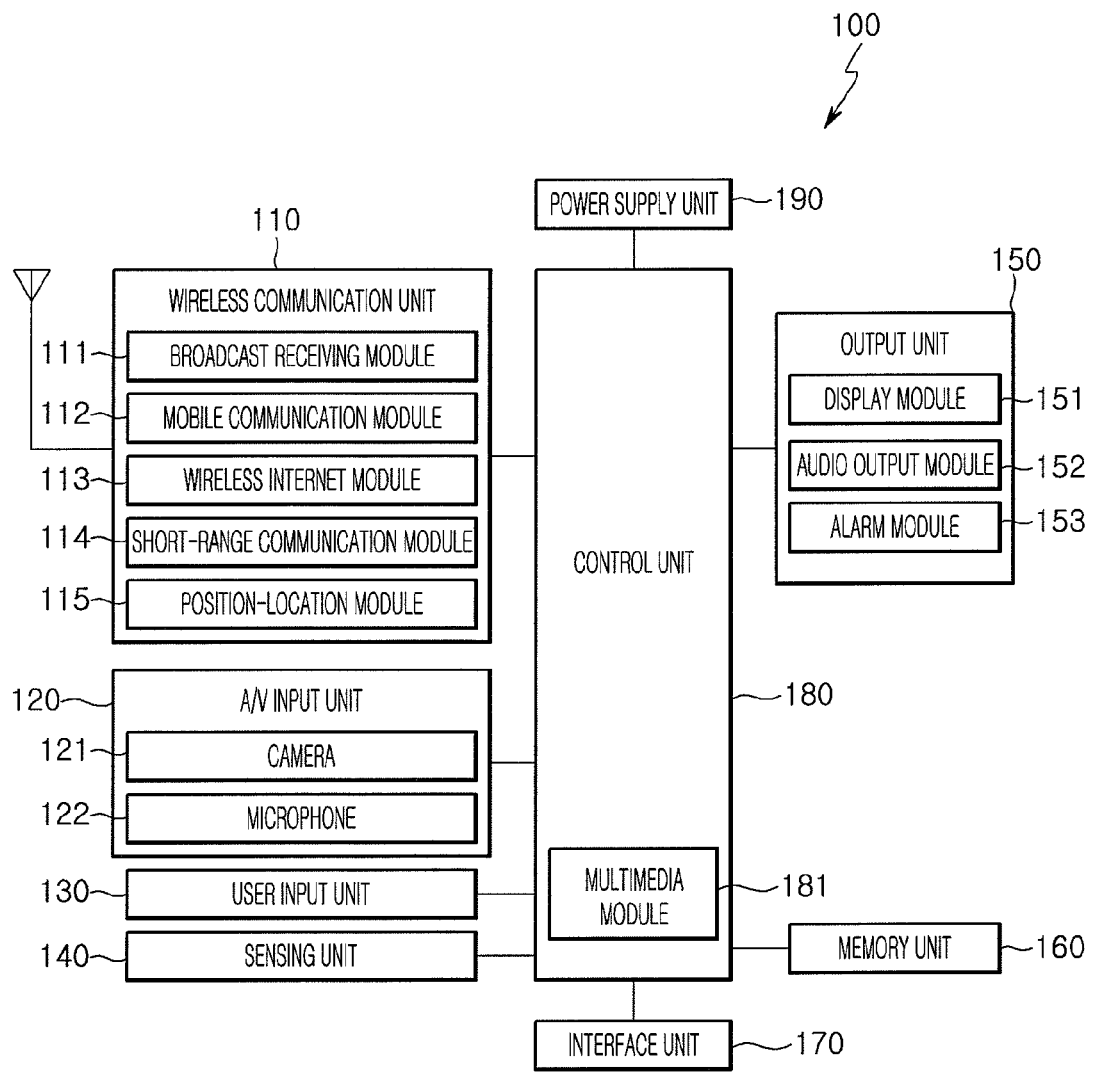
FIG. 18 is a block diagram of a mobile terminal usable as a remote control device in accordance with an embodiment of the preset invention.

FIG. 18 is a block diagram of a mobile terminal 100 usable as a remote control device 10 in accordance with an embodiment of the preset invention. The mobile terminal 100 may be implemented using a variety of different types of terminals. Examples of the mobile terminal 100 include mobile phones, user equipments, smart phones, computers, MP3 players, Portable Multimedia Players (PMPs), digital broadcast terminals, notebook computers, and navigators.

Referring to FIG. 18, the mobile terminal 100 may include a wireless communication unit 110, an audio/video (A/V) input unit 120, a user input unit 130, a sensing unit 140, an output unit 150, a memory unit 160, an interface unit 170, a control unit 180, and a power supply unit 190.

By way of non-limiting example only, further description will be with regard to a mobile terminal. However, such teachings apply equally to other types of terminals. FIG. 18 illustrates the mobile terminal 100 having various components, but it is understood that implementing all of the illustrated components is not a requirement. Greater or fewer components may alternatively be implemented.

FIG. 18 illustrates a wireless communication unit 110 configured with several commonly implemented components. For instance, the wireless communication unit 110 typically includes one or more components which permits wireless communication between the mobile terminal 100 and a wireless communication system or network within which the mobile terminal is located. For example, the wireless communication unit 110 may include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, and a broadcast service provider. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory unit 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. The short-range communication module 114 may be used as the short-range communication module 13 of FIG. 1. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal. If desired, this module may be implemented using global positioning system (GPS) components which cooperate with associated satellites, network components, and combinations thereof.

The A/V input unit 120 is configured to provide audio or video signal input to the mobile terminal. The A/V input unit 120 may include a camera 121 and a microphone 122. The camera 121 receives and processes image frames of still pictures or video. The processed image frames may be displayed on the display module 151.

The image frames processed by the camera 121 may be stored in the memory unit 160 or may be transmitted through the wireless communication unit 110 to external devices. The mobile terminal 100 may include two or more cameras 121 according to embodiments. The camera 121 may be used as the camera 121 of FIG. 1.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory unit 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. The user input unit 130 may be a touchscreen configured by installing a touch panel in the display unit 14 of FIG. 1.

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply unit 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless headset port, an external charter port, a wired/wireless data port, a card socket (e.g., for coupling to a memory card, subscriber identity module (SIM) card, user identity module (UIM) card, removable user identity module (RUIM) card), audio input/output ports, and video input/output ports, and an earphone port.

The output unit 150 generally includes various components which support the output requirements of the mobile terminal. The output unit may include a display module 151, an audio output module 152, and an alarm unit 153.

The display module 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display module 151 may additionally or alternatively display images which are associated with these modes. The display module 151 may be the display unit 14 of FIG. 1.

One particular implementation includes the display module 151 configured as a touch screen working in cooperation with an input device, such as a touchpad. This configuration permits the display to function both as an output device and an input device. The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

The audio output module 152 supports the audio output requirements of the mobile terminal 100. The audio output module is often implemented using one or more speakers, buzzers, other audio producing devices, and combinations thereof. The audio output module 152 functions in various modes including call-receiving mode, call-placing mode, recording mode, voice recognition mode and broadcast reception mode. During operation, the audio output module 152 outputs audio relating to a particular function (e.g., call received, message received, and errors). The audio output module 152 may include a speaker and a buzzer.

The alarm module 153 is commonly used to signal or otherwise identify the occurrence of a particular event associated with the mobile terminal. Typical events include call received, message received and user input received. An example of such output includes the providing of tactile sensations (e.g., vibration) to a user. For instance, the alarm module 153 may be configured to vibrate responsive to the mobile terminal receiving a call or message. As another example, vibration is provided by alarm module 153 responsive to receiving user input at the mobile terminal, thus providing a tactile feedback mechanism. It is understood that the various output provided by the components of output unit 150 may be separately performed, or such output may be performed using any combination of such components.

The memory unit 160 is generally used to store various types of data to support the processing, control, and storage requirements of the mobile terminal. Examples of such data include program instructions for applications operating on the mobile terminal, contact data, phonebook data, messages, pictures, video, etc.

The memory unit 160 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. Also, the mobile terminal 100 may operate a web storage to perform a storage function of the memory unit 150 on the Internet.

The control unit 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module 181 may be configured as part of the control unit 180, or this module may be implemented as a separate component. The control unit 180 may be the control unit 11 of FIG. 1.

The power supply unit 190 provides power required by the various components for the portable device. The provided power may be internal power, external power, or combinations thereof.

As described above, various embodiments of the present invention may be applicable to any mobile terminal 100 equipped with a camera. If the mobile terminal 100 is a smart phone, mobile terminal 100 may be implemented using an application capable of executing the above operations. When an application for implementation of a remote control device is installed and executed in a smart phone, the operations of the above-described various embodiments can be performed. The various embodiments of the present invention may be advantageous to a smart phone equipped with a touchscreen.

The buttons 21, 24, 23, 22 and 25 on the remote control device 10 may be configured to match with hard buttons on a smart phone. In the case of a smart phone equipped with a touch screen, the smart phone may be configured to display the matching buttons on the touchscreen.

According to the above-described configuration, a smart phone user may install a smart phone application in the smart phone for use as a remote control device.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by control unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory unit 160), and executed by a controller or processor (for example, control unit 180).

Although the present invention have been described with reference to a number of illustrative embodiments thereof, it should be understood that numerous other modifications and embodiments can be devised by those skilled in the art that will fall within the spirit and scope of the principles of the present invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. An automatic control device, comprising:
a camera unit configured to capture an image of a target device;
a communication unit configured to receive, from the target device, contents information about contents provided by the target device and transmit a control signal to the target device;
a display unit configured to display a synthesized image of a captured actual image of the target device and a virtual image of the contents provided by the target device based on the contents information;
a user input unit configured to receive a user input; and
a control unit configured to control/display the virtual image according to the received user input.

2. The automatic control device of claim 1, wherein the target device is a broadcast receiving device, and the contents information is channel information of the broadcast receiving device.

3. The automatic control device of claim 1,
wherein the contents include plural discrete content units,
wherein the virtual image of the contents comprises plural virtual images corresponding to the plural discrete content units, and
wherein the display unit is configured to display the plural virtual images in a predetermined pattern.

4. The automatic control device of claim 3, wherein the control unit is configured to move the plural virtual images according to the user input.

5. The automatic control device of claim 1, wherein the user input unit includes one of a touchscreen, a keybutton and a motion sensor.

6. The automatic control device of claim 5, wherein the user input unit includes a touchscreen configured to detect a drag gesture of a user, and the control unit is configured to move the virtual image according to the drag gesture.

7. The automatic control device of claim 5, wherein the user input unit includes a motion sensor configured to detect a motion of the remote control device, and the control unit is configured to move the virtual image according to the detected motion.

8. The automatic control device of claim 1, wherein the user input unit is configured to receive a user input to select the virtual image, and the control unit is configured to generate/transmit a control signal to display the contents provided by the target device.

9. The automatic control device of claim 5, wherein the control unit is configured to determine the motion of the remote control device by analyzing the captured actual image of the target device, and move the virtual image according to the determined motion.

10. The automatic control device of claim 1, wherein the communication unit is further configured to receive information about at least one external device connected to the target device, and the display unit is further configured to display at least one of a virtual image of the at least one external device and an image representing contents of the at least one external device.

11. The automatic control device of claim 10, wherein the user input unit is configured to receive a user input to select the virtual image of the at least one external device, and the control unit is configured to generate an external input conversion signal to control an output signal of the at least one external device, corresponding to the selected virtual image, to be outputted from the target device.

12. The automatic control device of claim 11, wherein when the external input conversion signal is transmitted to the target device, the communication unit is configured to receive information about contents of the at least one external device and the control unit is configured to perform a control operation to display a synthesized image of the captured actual image of the target device and a virtual image of the contents of the at least one external device.

13. An automatic control method of a remote control device, comprising:
    capturing, by the remote control device, an image of a target device;
    receiving, by the remote control device, information about contents provided by the target device;
    generating, by the remote control device, a virtual image of the contents based on the received contents information; and
    displaying, on the remote control device, a synthesized image of the captured actual image of the target device and the virtual image of the contents of the target device based on the contents information.

14. The automatic control method of claim 13, further comprising:
    receiving, by the remote control device, a user input to control the virtual image; and
    controlling/displaying, by the remote control device, the virtual image according to the received user input.

15. The automatic control method of claim 13, wherein the target device is a broadcast receiving device and the contents information is channel information.

16. The automatic control method of claim 14, further comprising:
    detecting a drag gesture on a touchscreen of the remote control device; and
    moving the virtual image according to the drag gesture.

17. The automatic control method of claim 14, further comprising:
    detecting a motion of the remote control device through a motion sensor of the remote control device; and
    moving, on the remote control device, the virtual image according to the detected motion.

18. The automatic control method of claim 13, further comprising:
    receiving a user selection of the virtual image of the contents;
    generating, by the remote control unit, a control signal to execute the contents, corresponding to the selected virtual image, in the target device; and
    transmitting the control signal from the remote control unit to the target device.

19. The automatic control method of claim 13, further comprising:
    receiving, by the remote control unit, information of an external device connected to the target device; and
    displaying, by the remote control unit, a virtual image of the external device based on the received external device information.

20. The automatic control method of claim 19, further comprising:
    receiving, by the remote control unit, a user selection of the virtual image of the external device; and
    generating, by the remote control unit, an external input conversion signal to control an output signal of the external device, corresponding to the selected virtual image, to be outputted from the target device.

* * * * *